(12) United States Patent
Carey

(10) Patent No.: US 12,283,168 B2
(45) Date of Patent: *Apr. 22, 2025

(54) VIDEO IDENTIFICATION AND ANALYTICAL RECOGNITION SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,855

(22) Filed: Jan. 9, 2024

(65) Prior Publication Data

US 2024/0144799 A1 May 2, 2024

Related U.S. Application Data

(63) Continuation of application No. 17/348,477, filed on Jun. 15, 2021, now Pat. No. 11,869,325, which is a
(Continued)

(51) Int. Cl.
*G08B 15/00* (2006.01)
*G06T 7/20* (2017.01)
(Continued)

(52) U.S. Cl.
CPC .............. *G08B 15/004* (2013.01); *G06T 7/20* (2013.01); *G06T 7/246* (2017.01); *G06V 20/13* (2022.01); *G06V 20/52* (2022.01); *G06V 20/53* (2022.01); *G06V 40/10* (2022.01); *G06V 40/161* (2022.01); *G06V 40/20* (2022.01); *G06V 40/23* (2022.01); *G08B 13/19608* (2013.01);
(Continued)

(58) Field of Classification Search
None
See application file for complete search history.

(56) References Cited

U.S. PATENT DOCUMENTS 6,975,346 B2 12/2005 Kumhyr
7,308,487 B1 12/2007 Dansie et al.
(Continued)

FOREIGN PATENT DOCUMENTS

JP 2004005511 A 1/2004
JP 2007142527 A * 6/2007 ............... H04N 7/18
(Continued)

OTHER PUBLICATIONS

Extended European Search Report for corresponding application No. EP 14 76 4242 dated Aug. 26, 2015.
(Continued)

*Primary Examiner* — Reza Aghevli
(74) *Attorney, Agent, or Firm* — Carter, DeLuca & Farrell LLP

(57) ABSTRACT

An analytical recognition system includes a video camera, an antenna, and a data analytics module. The video camera is configured to capture video data. The antenna is configured to capture mobile communication device data. The data analytics module is configured to correlate the video data and the mobile communication device data to generate a profile of a person associated with the video data and the mobile communication device data. The profile has profile data including any one or a combination of the captured video data and the captured mobile communication data.

12 Claims, 9 Drawing Sheets

Related U.S. Application Data continuation of application No. 16/571,522, filed on Sep. 16, 2019, now Pat. No. 11,039,108, which is a continuation of application No. 15/469,885, filed on Mar. 27, 2017, now Pat. No. 10,432,897, which is a continuation of application No. 14/817,871, filed on Aug. 4, 2015, now Pat. No. 9,762,865, which is a continuation-in-part of application No. 14/256,385, filed on Apr. 18, 2014, now Pat. No. 11,100,334, and a continuation-in-part of application No. 14/213,548, filed on Mar. 14, 2014, now Pat. No. 9,786,113.

(60) Provisional application No. 61/813,942, filed on Apr. 19, 2013, provisional application No. 61/798,740, filed on Mar. 15, 2013.

(51) Int. Cl.
  *G06T 7/246* (2017.01)
  *G06V 20/13* (2022.01)
  *G06V 20/52* (2022.01)
  *G06V 40/10* (2022.01)
  *G06V 40/16* (2022.01)
  *G06V 40/20* (2022.01)
  *G08B 13/196* (2006.01)
  *H04N 7/18* (2006.01)
  *H04N 23/45* (2023.01)
  *H04W 8/00* (2009.01)

(52) U.S. Cl.
  CPC ....... *G08B 13/19613* (2013.01); *H04N 7/181* (2013.01); *H04N 7/185* (2013.01); *H04N 23/45* (2023.01); *H04W 8/005* (2013.01); *G06T 2207/10016* (2013.01); *G06T 2207/30232* (2013.01)

(56) References Cited

U.S. PATENT DOCUMENTS

| | | | |
|---|---|---|---|
| 7,619,508 B2 * | 11/2009 | Lynam | B60R 11/04 348/148 |
| 7,683,929 B2 * | 3/2010 | Elazar | H04N 7/18 348/169 |
| 7,769,221 B1 | 8/2010 | Shakes | |
| 7,965,312 B2 | 6/2011 | Chung | |
| 8,072,318 B2 * | 12/2011 | Lynam | H04N 23/63 348/148 |
| 8,195,598 B2 | 6/2012 | Hua et al. | |
| 8,271,336 B2 | 9/2012 | Mikurak | |
| 8,615,254 B2 * | 12/2013 | Jamtgaard | H04W 4/029 382/107 |
| 8,653,959 B2 * | 2/2014 | Lynam | B60R 1/12 348/148 |
| 9,101,279 B2 * | 8/2015 | Ritchey | G06F 3/147 |
| 9,352,623 B2 * | 5/2016 | Lynam | H04N 23/63 |
| 9,406,336 B2 | 8/2016 | Bose et al. | |
| 9,451,899 B2 * | 9/2016 | Ritchey | G06T 11/60 |
| 9,694,749 B2 * | 7/2017 | Lynam | B60D 1/58 |
| 9,762,865 B2 * | 9/2017 | Carey | H04N 7/181 |
| 9,773,163 B2 * | 9/2017 | Carey | H04N 7/183 |
| 9,786,113 B2 * | 10/2017 | Carey | G07F 9/026 |
| 10,078,787 B2 | 9/2018 | Carey | |
| 10,272,839 B2 * | 4/2019 | Lynam | G06V 20/593 |
| 10,432,897 B2 * | 10/2019 | Carey | H04N 7/181 |
| 10,972,704 B2 | 4/2021 | Carey | |
| 11,039,108 B2 * | 6/2021 | Carey | H04W 4/029 |
| 11,055,356 B2 * | 7/2021 | Ritchey | G06N 20/00 |
| 11,100,334 B2 | 8/2021 | Carey | |
| 11,743,431 B2 | 8/2023 | Carey | |
| 11,869,325 B2 * | 1/2024 | Carey | G06T 7/20 |
| 2001/0010541 A1 | 8/2001 | Fernandez | |
| 2003/0067542 A1 | 4/2003 | Monroe | |
| 2003/0197612 A1 | 10/2003 | Tanaka et al. | |
| 2004/0117638 A1 | 6/2004 | Monroe | |
| 2004/0143602 A1 | 7/2004 | Ruiz | |
| 2004/0161133 A1 * | 8/2004 | Elazar | G08B 13/19615 382/115 |
| 2006/0064384 A1 | 3/2006 | Mehrotra | |
| 2006/0244826 A1 | 11/2006 | Chew | |
| 2007/0003141 A1 | 1/2007 | Rittscher et al. | |
| 2007/0057049 A9 | 3/2007 | Kundu et al. | |
| 2007/0127774 A1 | 6/2007 | Zhang et al. | |
| 2007/0297607 A1 | 12/2007 | Ogura et al. | |
| 2008/0015013 A1 | 1/2008 | Gelman et al. | |
| 2008/0018738 A1 | 1/2008 | Lipton et al. | |
| 2008/0106599 A1 | 5/2008 | Liu et al. | |
| 2008/0198231 A1 | 8/2008 | Ozdemir et al. | |
| 2009/0033745 A1 | 2/2009 | Yeredor et al. | |
| 2009/0052747 A1 | 2/2009 | Kamiyama et al. | |
| 2009/0141939 A1 | 6/2009 | Chambers | |
| 2009/0189981 A1 | 7/2009 | Siann et al. | |
| 2009/0222388 A1 | 9/2009 | Hua et al. | |
| 2009/0268030 A1 | 10/2009 | Markham | |
| 2010/0026802 A1 | 2/2010 | Titus et al. | |
| 2010/0079594 A1 | 4/2010 | Voglewede et al. | |
| 2010/0111377 A1 | 5/2010 | Monroe | |
| 2010/0135643 A1 | 6/2010 | Fleming | |
| 2010/0141786 A1 | 6/2010 | Bigioi | |
| 2010/0182428 A1 | 7/2010 | Lu et al. | |
| 2010/0234986 A1 | 9/2010 | Clopton | |
| 2010/0260426 A1 | 10/2010 | Huang et al. | |
| 2010/0311347 A1 | 12/2010 | Le Thierry D'Ennequin et al. | |
| 2010/0318566 A1 | 12/2010 | Yoshio et al. | |
| 2010/0321183 A1 | 12/2010 | Donovan et al. | |
| 2010/0329513 A1 | 12/2010 | Klefenz | |
| 2011/0128374 A1 | 6/2011 | Shellshear et al. | |
| 2011/0134240 A1 * | 6/2011 | Anderson | H04W 4/38 348/143 |
| 2011/0211070 A1 | 9/2011 | Shu et al. | |
| 2011/0273309 A1 | 11/2011 | Zhang et al. | |
| 2012/0008836 A1 | 1/2012 | Bobbitt et al. | |
| 2012/0069131 A1 * | 3/2012 | Abelow | G06Q 30/0601 345/589 |
| 2012/0076356 A1 | 3/2012 | Li et al. | |
| 2012/0127314 A1 | 5/2012 | Clements | |
| 2012/0147169 A1 | 6/2012 | Harper et al. | |
| 2012/0190380 A1 | 7/2012 | Dupray et al. | |
| 2012/0206592 A1 * | 8/2012 | Gerst, III | G01B 11/24 348/86 |
| 2012/0208592 A1 | 8/2012 | Davis et al. | |
| 2012/0218412 A1 * | 8/2012 | Dellantoni | G01C 21/3602 348/148 |
| 2012/0229647 A1 | 9/2012 | Calman et al. | |
| 2012/0233032 A1 | 9/2012 | Calman et al. | |
| 2012/0233033 A1 | 9/2012 | Calman et al. | |
| 2012/0262575 A1 * | 10/2012 | Champagne | G08B 13/19613 348/143 |
| 2012/0311564 A1 | 12/2012 | Khalid | |
| 2012/0320195 A1 * | 12/2012 | Tener | G01C 21/005 348/135 |
| 2012/0324061 A1 | 12/2012 | Parsons et al. | |
| 2012/0327241 A1 * | 12/2012 | Howe | G06V 20/52 382/103 |
| 2013/0027561 A1 | 1/2013 | Lee et al. | |
| 2013/0030875 A1 | 1/2013 | Lee | |
| 2013/0041961 A1 | 2/2013 | Thrower, III et al. | |
| 2013/0063550 A1 * | 3/2013 | Ritchey | A61B 5/7246 345/207 |
| 2013/0073366 A1 | 3/2013 | Heath | |
| 2013/0101159 A1 | 4/2013 | Chao et al. | |
| 2013/0155229 A1 * | 6/2013 | Thornton | H04N 7/18 348/143 |
| 2013/0201333 A1 * | 8/2013 | Yoon | G06T 7/77 348/143 |
| 2013/0271598 A1 * | 10/2013 | Mariadoss | H04N 21/6175 348/207.1 |
| 2014/0018059 A1 | 1/2014 | Noonan | |
| 2014/0052680 A1 | 2/2014 | Nitz et al. | |
| 2014/0052681 A1 | 2/2014 | Nitz et al. | |
| 2014/0132767 A1 | 5/2014 | Sonnabend | |

(56) References Cited

U.S. PATENT DOCUMENTS

| | | | |
|---|---|---|---|
| 2014/0201126 A1 | 7/2014 | Zadeh | |
| 2014/0214676 A1* | 7/2014 | Bukai | G10L 17/24 |
| | | | 705/44 |
| 2014/0253727 A1* | 9/2014 | Sadrieh | H04N 21/2743 |
| | | | 348/143 |
| 2014/0277902 A1* | 9/2014 | Koch | G07C 5/008 |
| | | | 701/29.1 |
| 2014/0285660 A1 | 9/2014 | Jamtgaard et al. | |
| 2014/0309863 A1 | 10/2014 | Ricci | |
| 2014/0316616 A1 | 10/2014 | Kugelmass | |
| 2014/0357312 A1* | 12/2014 | Davis | H04N 23/70 |
| | | | 455/550.1 |
| 2015/0054639 A1 | 2/2015 | Rosen | |
| 2015/0106628 A1 | 4/2015 | Holman | |
| 2015/0163345 A1 | 6/2015 | Cornaby | |
| 2015/0189240 A1 | 7/2015 | Shmueli | |
| 2015/0223731 A1 | 8/2015 | Sahin | |
| 2015/0317801 A1 | 11/2015 | Bentley et al. | |
| 2015/0318015 A1 | 11/2015 | Bose et al. | |
| 2015/0324692 A1* | 11/2015 | Ritchey | G06N 20/00 |
| | | | 348/36 |
| 2015/0341599 A1 | 11/2015 | Carey | |
| 2016/0292881 A1 | 10/2016 | Bose et al. | |
| 2016/0322078 A1 | 11/2016 | Bose et al. | |
| 2017/0061034 A1* | 3/2017 | Ritchey | G09G 5/026 |
| 2017/0200052 A1 | 7/2017 | Carey | |
| 2019/0172293 A1 | 6/2019 | Carey | |
| 2020/0014885 A1 | 1/2020 | Carey | |
| 2020/0045267 A1 | 2/2020 | Carey | |
| 2020/0221054 A1 | 7/2020 | Carey | |

FOREIGN PATENT DOCUMENTS

| | | |
|---|---|---|
| JP | 2008204079 A | 9/2008 |
| JP | 2013513336 A | 4/2013 |
| RU | 83675 U1 | 6/2009 |
| RU | 2382408 C2 | 2/2010 |
| RU | 2459267 C2 | 8/2012 |
| WO | 2007139994 A2 | 12/2007 |
| WO | 2009111498 A2 | 9/2009 |
| WO | 2011001180 A1 | 1/2011 |
| WO | 2011071720 A1 | 6/2011 |
| WO | 2012102909 A1 | 8/2012 |
| WO | 2012170551 A2 | 12/2012 |
| WO | 2013030296 A1 | 3/2013 |
| WO | 2014155958 A1 | 10/2014 |

OTHER PUBLICATIONS

International Search Report for PCT/US14/28940 dated Aug. 27, 2014.
Daniel A. Vaquero et al., "Attribute-Based People Search," Chapter 14, Intellegent Video Surveillance: Systems and Technology, published Dec. 7, 2009, pp. 387-405.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
International Search Report for corresponding application No. EP 14 76 4242 dated Aug. 26, 2015.
Thailand Office Action dated May 25, 2020 issued in corresponding Thailand Appln. No. 1501006385.
Extended European Search Report dated May 14, 2020 issued in corresponding EP Appln. No. 20153816.2.
Brazilian Office Action dated Feb. 27, 2020 corresponding to counterpart Patent Application BR 112015026374.
Extended European Search Report dated Nov. 22, 2016, in connection with EP Application No. 16193237, 7 pages.
"Real-time Monitoring for Crowd Counting using Video Surveillance and GIS," H. Song et al., IEEE, 2nd International Conference on Remote Sensing, Environment and Transportation Engineering (RSETE), Jun. 1, 2012, 4 pages.
International Search Report and Written Opinion dated Sep. 1, 2016, in connection with International Application No. PCT/US16/45371 (12 pages).
Extended European Search Report issued in European Patent Application No. 14723302.7 dated Mar. 2, 2016, 11 pages.
International Search Report for PCT Application Serial No. PCT/US2014/034633, dated Dec. 2, 2014.
International Preliminary Search Report for PCT Application Serial No. PCT/US2014/034633, dated Oct. 29, 2015, 7 pages.
International Preliminary Search Report for PCT Application Serial No. PCT/US2013/070067, dated Sep. 15, 2015, 6 pages.
"Configuration Backup Restore", Jun. 30, 2010, XP055127450, retrieved from the Internet: URL: https:\\downloads.avaya.com/css/P8/documents/100088380.
Russian Office Action dated May 2, 2017 in corresponding Russian Patent Application No. 2015147449 with English translation, 8 pages.
Russian Office Action dated Oct. 23, 2017 in corresponding Russian Patent Application No. 2015147449, together with English translation, 12 pages.
Canadian Office Action issued in Appl. No. CA 2,851,732 dated Dec. 12, 2017 (4 pages).
International Preliminary Report on Patentability and Written Opinion of the International Searching Authority Issed in Int'l Appl. No. PCT/US2016/045371 dated Feb. 15, 2018 (10 pages).
European Examination Report issued in Appl. No. EP 14723302.7 dated Mar. 2, 2018 (5 pages).
https://www.nytimes.com/2013/07/15/business/attention-shopper-stores-are-t- racking-your-cell.html?_r=1& [retrieved on Aug. 2, 2018].
Supplementary European Search Report dated Jul. 6, 2018 issued in corresponding EP Appln. No. 16833814.3.
Canadian Office Action dated May 25, 2018 issued in corresponding CA Appln. No. 2,973,866.
European Office Action dated Jul. 9, 2019 issued in corresponding EP Appln. No. 16 833 814.3.
Daniel A. Vaquero et al., "Attribute-Based People Search," Chapter 14, Intellegent Video Surveillance: Systems and Technology, published Dec. 16, 2009, pp. 387-405.
Supplementary European Search Report issued in corresponding European Patent Application No. 14723302.7 dated Mar. 2, 2016, 11 pages.
Russian Office Action dated Jan. 18, 2017 in corresponding Russian Patent Application No. 2015147449 together with English translation, 12 pages.
International Preliminary Search Report for corresponding PCT Application Serial No. PCT/US2014/034633, dated Oct. 29, 2015, 7 pages.
https://www.nytimes.com/2013/07/15/business/attention-shopper-stores-are-t- racking-your-cell.html ?_r=1& [retrieved on Aug. 1, 2018].
Russian Office Action dated Oct. 14, 2019 corresponding to counterpart Patent Application RU 2018104654/07 (006960).
European Office Action dated Dec. 2, 2019 corresponding to counterpart Patent Application EP 14723302.7.
Russian Search Report completed Sep. 11, 2019 corresponding to counterpart Patent Application RU 2018104654/07 (006960).
Japanese Office Action dated Jul. 20, 2020 issued in corresponding JP Appln. No. 2018-526490.
Brazilian Office Action dated Aug. 17, 2020 issued in corresponding BR Appln. No. BR112018002281-0.
European Examination Report dated Sep. 24, 2020 issued in corresponding EP Appln. No. 16 193 237.1.
Canadian Office Action dated Nov. 25, 2020 issued in corresponding CA Appln. No. 3,056, 190.
Extended European Search Report dated Dec. 11, 2020 issued in corresponding EP Appln. No. 20201200.1.
Russian Office Action dated Oct. 14, 2019 corresponding to counterpart Patent Application RU 2018104654/07.
Clifford et al.: "Attention, Shoppers: Store is Tracking Your Cell," The New York Times, available at https://www.nytimes.com/2013/07/15/business/attention-shopper-stores-are-- tracking-your-cell.html?_r=1& [retrieved on Aug. 2, 2018].

(56) References Cited

OTHER PUBLICATIONS

Russian Search Report completed Sep. 11, 2019 corresponding to counterpart Patent Application RU 2018104654/07.
European Decision dated Dec. 2, 2019 corresponding to counterpart Patent Application EP 14723302.7.
Canadian Office Action dated Oct. 26, 2021 issued in corresponding CA Appln. No. 3,056,190.
Canadian Office Action issued in corresponding application CA 3,056,190 dated Oct. 26, 2021 (4 pages).
European Examination Report dated Mar. 11, 2022 issued in corresponding EP Appln. No. 20 153 816.2.
Canadian Office Action issued in corresponding application CA 2,994,712 dated Jan. 17, 2023 (4 pages).
Canadian Office Action issued in corresponding application CA 3,056,190 dated Jan. 19, 2023 (4 pages).
Canadian Office Action issued in corresponding application 3,095,814 dated Jun. 27, 2023 (4 pages).
Canadian Office Action issued in corresponding application CA 3056190 dated Sep. 27, 2023.
Office Action issued in corresponding Canadian Application No. 2,994,712 dated Dec. 6, 2023 (4 pages).
Office Action issued in corresponding Brazilian Application BR 11 2018 002281 0 published Apr. 24, 2024, together with English language machine translation prepared by DeepL (8 pages).
Office Action issued in corresponding Brazilian Application No. BR112018002281-0 dated Oct. 21, 2024, together with English language translation (7 pages).

* cited by examiner

VIDEO IDENTIFICATION AND ANALYTICAL RECOGNITION SYSTEM

CROSS-REFERENCE TO RELATED APPLICATIONS

The present application is a continuation of U.S. patent application Ser. No. 17/348,477, filed on Jun. 15, 2021, now U.S. Pat. No. 11,869,325, which is a continuation of U.S. patent application Ser. No. 16/571,522, filed on Sep. 16, 2019, now U.S. Pat. No. 11,039,108, which is a ation-in-part of U.S. patent application Ser. No. 15/469,885, filed on Mar. 27, 2017, now U.S. Pat. No. 10,432,897, which is a continuation of U.S. patent application Ser. No. 14/817,871 filed on Aug. 4, 2015, now U.S. Pat. No. 9,762,865, which is a continuation-in-part of U.S. patent application Ser. No. 14/256,385 filed on Apr. 18, 2014, now U.S. Pat. No. 11,100,334, which claims priority to, and the benefit of, U.S. Provisional Patent Application No. 61/813,942 filed on Apr. 19, 2013. U.S. patent application Ser. No. 14/817,871 is also a continuation-in-part of U.S. patent application Ser. No. 14/213,548 filed on Mar. 14, 2014, now U.S. Pat. No. 9,786,113, which claims priority to, and the benefit of, U.S. Provisional Patent Application No. 61/798,740 filed on Mar. 15, 2013. The entire contents of each of the foregoing applications are hereby incorporated by reference herein.

BACKGROUND

1. Technical Field

The following relates to video observation, surveillance and verification systems and methods of use. The specific application may work in conjunction with surveillance systems, street cameras, personal video, in-store camera systems, parking lot camera systems, etc. and is configured to provide real time and/or post time data analysis of one or more video streams.

2. Background of Related Art

Companies are continually trying to identify specific user behavior in order to improve the throughput and efficiency of the company. For example, by understanding user behavior in the context of the retail industry, companies can both improve product sales and reduce product shrinkage. Focusing on the latter, employee theft is one of the largest components of retail inventory shrink. Therefore, companies are trying to understand user behavior in order to reduce and ultimately eliminate inventory shrinkage.

Companies have utilized various methods to prevent employee shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Most procedures and technologies focus on identifying individual occurrences instead of understanding the underlying user behaviors that occur during these events. As such, companies are unable to address the underlying condition that allows individuals to commit theft.

Surveillance systems, street camera systems, store camera systems, parking lot camera systems, and the like are widely used. In certain instances, camera video is continually streaming and a buffer period of 8, 12, 24, 48 hours, for example, is used and then overwritten should a need not arise for the video. In other systems, a longer period of time may be utilized or the buffer is weeks or months of data being stored and saved for particular purposes. As can be appreciated, when an event occurs, the video is available for review and analysis of the video data. In some instances, the video stream captures data and analyzes various pre-determined scenarios based upon automatic, user input, or programming depending upon a particular purpose. For example, the video may be programmed to follow moving objects from entry into a store and throughout the store for inventory control and/or video monitoring of customers.

In other instances, police, FBI or rescue personal need to review the various camera systems in a particular area or arena for investigative purposes, e.g., to track suspects, for car accident review, or other video evidence necessary to their investigation. As is often the case, snippets of video from various camera systems throughout the area can be critical in piecing together a visual map of the event in question. In other scenarios, an individual's habits or behaviors may become suspicious and deserved of monitoring or tracking for real-time analysis and alerts and/or post time investigative analysis.

There exists a need to further develop this analytical technology and provide real time and post time analysis of video streams for security and investigative purposes and for marketing purposes.

SUMMARY

According to an aspect of the present disclosure, an analytical recognition system is provided. The analytical recognition system includes a video camera, an antenna, and a data analytics module. The video camera is configured to capture video data. The antenna is configured to capture mobile communication device data. The data analytics module is configured to correlate the video data and the mobile communication device data to generate a profile of a person associated with the video data and the mobile communication device data. The profile has profile data including any one or a combination of the captured video data and the captured mobile communication data.

In any one of the preceding aspects, the data analytics module is configured to determine any one or a combination of an arrival time of the person at a location and a departure time of the person at the location based on any one or a combination of the video data and the mobile communication device data, and correlate the video data and the mobile communication device data based on any one or a combination of the arrival time and the departure time.

In any one of the preceding aspects, the video camera is one of a plurality of video cameras included in the system and configured to capture a plurality of video data, the antenna is one of a plurality of antennae included in the system and configured to capture a plurality of mobile communication device data. The data analytics module can be further configured to correlate the plurality of video data and the plurality of mobile communication device data to generate a plurality of profiles of a plurality of people, respectively associated with the plurality of video data and the plurality of mobile communication device data According to another aspect of the present disclosure, the plurality of video cameras and the plurality of antennae are located at a plurality of premises.

In another example aspect herein, the analytical recognition system further includes a user interface configured to enable the plurality of profiles to be mined based on a user-inputted criterion.

According to yet a further aspect herein, at least one of the plurality of the antennae is affixed to at least one of the plurality of the video cameras and at least one of the plurality of antennae is located remote from the plurality of cameras.

In any one of the preceding aspects, the profile can include any one or a combination of the captured video data, the captured mobile communication device data, temporal data associated with the captured video data or the captured mobile communication device data, and location data associated with the captured video data or the captured mobile communication device data. The captured video data can include any one or a combination of a captured still image and video footage. The mobile communication device data can include any one or a combination of a WiFi identifier, a media access control (MAC) identifier, a Bluetooth identifier, a cellular identifier, a near field communication identifier, and a radio frequency identifier associated with a mobile communication device in communication with the antenna. The temporal data can include any one or a combination of a time the video data is captured and a time the mobile communication device data is captured. Tithe location data can include any one or a combination of a location at which the video data is captured and a location at which the mobile communication device data is captured.

In any one of the preceding aspects, the data analytics module is further configured to add to the profile, based on the correlated video data and mobile communication device data, any one or a combination of a number of visits of the person to a premises and a frequency of visits of the person to the premises.

In any one of the preceding aspects, the data analytics module is further configured to identify the person based on a comparison between data from a first source and any one or a combination of the captured video data, the captured mobile communication device data, the correlated video data and mobile communication device data, and the profile, wherein the first source includes any one or a combination of a non-government database, a government database, and one or more previously generated profiles.

In any one of the preceding aspects, the analytical recognition system further includes an investigation module configured to receive investigation criteria and mine any one or a combination of the video data, the mobile communication device data, and the profile data based on the criteria.

In a further aspect herein, the investigation criteria includes a time frame, and wherein the investigation module is further configured to generate a list of people whose presence was detected on a premises during the time frame.

According to another aspect of the present disclosure, the investigation module is further configured to determine a current location of the person by detecting a signal that matches the mobile communication device data obtained at a first location.

In any one of the preceding aspects, the antenna includes any one or a combination of a WiFi antenna, a media access control (MAC) antenna, a Bluetooth antenna, a cellular antenna, a near field communication antenna, and a radio frequency identification antenna.

In any one of the preceding aspects, the data analytics module is further configured to assign the person to a positive list, an undetermined list, or a negative list based on any one or a combination of the video data, the mobile communication device data, the profile data, and a user-inputted criteria.

According to another aspect of the present disclosure, the data analytics module is further configured to assign the person to the positive list based on a determination that any one or a combination of the video data, the mobile communication device data, and the profile corresponds to an employee or to a person on a predetermined list of people.

In any one of the preceding aspects, the antenna is configured to capture the mobile communication device data by wirelessly receiving data from a mobile communication device located within a range of the antenna.

In any one of the preceding aspects, the data analytics module is further configured to detect a behavior of the person and store in the profile behavioral data corresponding to the behavior.

According to another aspect of the present disclosure, the data analytics module is configured to detect the behavior of the person by extracting behavioral information from any one or a combination of the video data and the mobile communication device data. The behavior includes any one or a combination of looking in a direction, reaching for an item of merchandise, purchasing the item of merchandise, traveling along a path at the premises, visiting an aisle or a location at the premises, spending an amount of time at the premises, spending an amount of time at the location at the premises, and visiting the premises on a number of separate instances.

In a further aspect herein, the data analytics module is configured to classify the person as a new customer or a repeat customer at the premises based on premises visit data stored in the profile, and add to the profile, or update in the profile, an indicator of whether the person is a new customer or a repeat customer at the premises.

According to another aspect herein, the data analytics module is configured to detect the behavior of the person by correlating any one or a combination of the video data, the mobile communication device data, and the profile data with any one or a combination of a mapping of aisle locations at a premises, a mapping of merchandise locations at the premises, and a mapping of shelf locations at the premises.

In a further aspect herein, the analytical recognition system further includes an investigation module configured to mine, based on report criteria, any one or a combination of the video data, the mobile communication device data, the profile data, and sales data. The investigation module is further configured to generate a report based on the mining of the any one or the combination of the video data, the mobile communication device data, and the profile data. The report includes a sales close rate corresponding to any one or a combination of an item of merchandise, a merchandise category, an aisle at the premises, a shelf at the premises, or a predetermined location at the premises.

According to another aspect herein, the data analytics module is further configured to generate, based on any one or a combination of the video data and the mobile communication device data, location data corresponding to the behavior, and store the location data in the profile in association with the behavioral data.

DEFINITIONS

Figure 1:
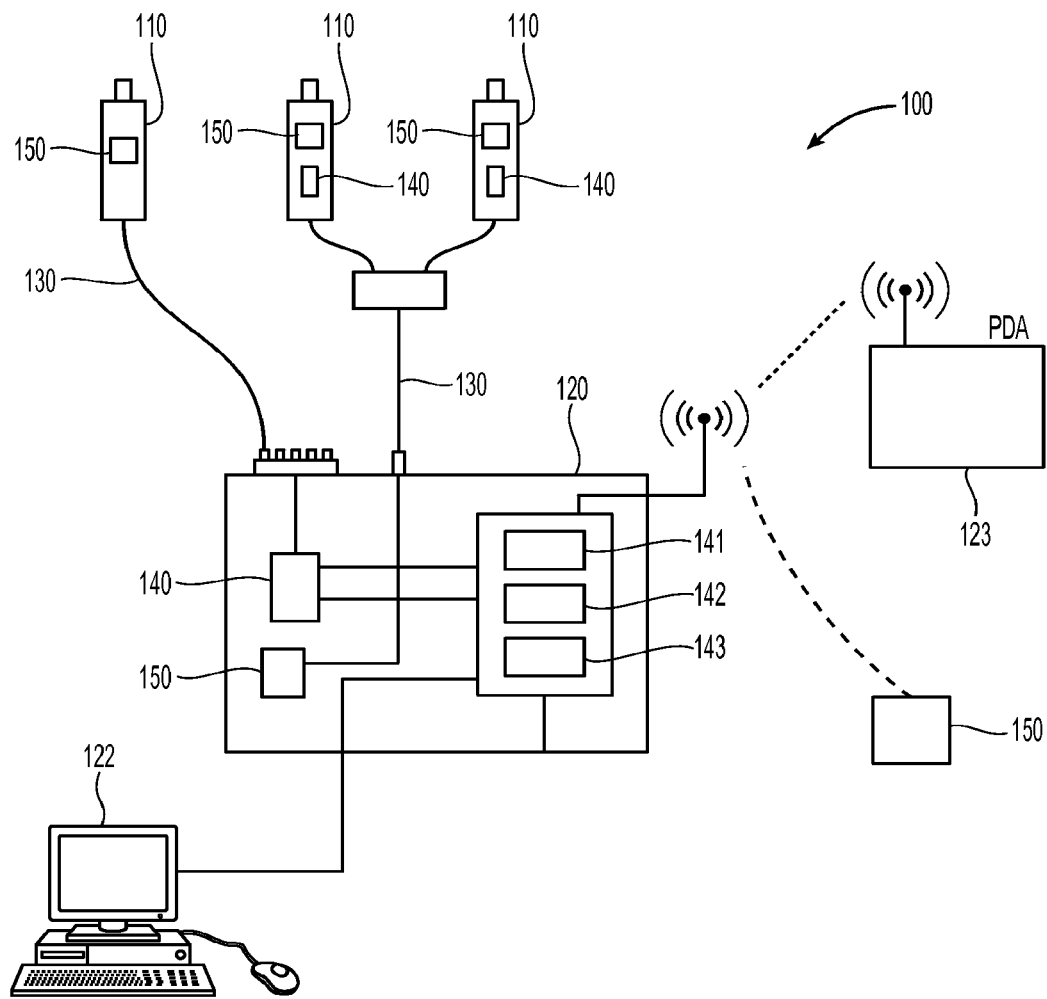
FIG. 1 is a system block diagram of an embodiment of a video observation, surveillance and verification system in accordance with the present disclosure.

The following definitions are applicable throughout this disclosure (including above).

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan/tilt/zoom (PTZ) camera; and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non-visual information extracted from the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant 123 (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic. In this description, the terms "software" and "code" may be applicable to software, firmware, or a combination of software and firmware.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon. "Non-transitory" computer-readable medium include all computer-readable medium, with the sole exception being a transitory, propagating signal.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

"Real time" analysis or analytics generally refers to processing real time or "live" video and providing near instantaneous reports or warnings of abnormal conditions (pre-programmed conditions), abnormal scenarios (loitering, convergence, separation of clothing articles or backpacks, briefcases, groceries for abnormal time, etc.) or other scenarios based on behavior of elements (customers, patrons, people in crowd, etc.) in one or multiple video streams.

"Post time" analysis or analytics generally refers to processing stored or saved video from a camera source (from a particular camera system (e.g., store, parking lot, street) or other video data (cell phone, home movie, etc.)) and providing reports or warnings of abnormal conditions (post-programmed conditions), abnormal scenarios (loitering, convergence, separation of clothing articles or backpacks, briefcases, groceries for abnormal time, etc. or other scenarios based on behavior of elements (customers, patrons, people in crowd, etc.) in one or more stored video streams.

"Mobile communication device data" generally refers to data transmitted by, and/or obtained from, a mobile communication device by way of a wireless or wired communication protocol.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, Linux, and/or Android®.

Further, it should be noted that the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general-purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

With reference to FIG. 1, an analytical recognition system including video observation, surveillance and verification according to an embodiment of this disclosure is shown as 100. System 100 is a network video and data recorder that includes the ability to record video from one or more cameras 110 (e.g., analog and/or IP camera) and other data obtained by way of one or more antennae 150. Video cameras 110 connect to a computer 120 across a connection 130. Connection 130 may be an analog connection that provides video to the computer 120, a digital connection that provides a network connection between the video camera 110 and the computer 120, or the connection 130 may include an analog connection and a digital connection.

Each video camera 110 connects to the computer 120 and a user interface 122 to provide a user connection to the computer 120. The one or more video cameras 110 may each connect via individual connections and may connect through a common network connection, or through any combination thereof.

The one or more antennae 150 may be affixed to, or included within, the one or more video cameras 110 or the computer 120, and/or may be located remote from the one or more video cameras 110 and the computer 120. The one or more antennae 150 may be communicatively coupled to the computer 120 by way of the connection 130 or may wirelessly communicate with the computer 120 by way of an antenna of the computer 120.

The one or more antennae 150 may be any one or a combination of various types of antennae. Example types of the one or more antennae 150 include a WiFi antenna, a media access control (MAC) antenna, a Bluetooth antenna, a cellular antenna, a near field communication antenna, a radio frequency identification (RFID) antenna, and a global positioning system (GPS) antenna. It should be understood that the example arrangement of the antennae 150 shown in FIG. 1 is provided for illustrative purposes only, and other configurations of the antennae 150 are contemplated. For instance, a single camera 110 may include a plurality of antennae of different types.

As discussed in more detail herein, the one or more antennae 150 are configured to capture mobile communication device data from one or more mobile communication devices (e.g., smartphones) located within a range of the one or more antennae 150 and transmit the captured mobile communication device data to a data analytics module 140 for processing in accordance with various example embodiments herein. The antenna 150 may be configured to capture the mobile communication device data by wirelessly receiving data transmitted by a mobile communication device that is located within a range of the antenna. The antenna 150 may be configured to wirelessly receive data from nearby mobile communication devices by periodically or continually pinging mobile communication devices and/or by being configured to periodically or continually listen for and capture data transmitted by nearby mobile communication devices without using pinging.

System 100 includes at least one data analytics module 140. A data analytics module 140 may reside in the computer 120 and/or in one or more of the video cameras 110. Data analytics module 140 performs processing of the video and/or the mobile communication device data. For instance, data analytics module 140 performs one or more algorithms to generate non-video data from video and/or from the mobile communication data. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as temporal properties of an object identified in two or more frames and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video. Objects may be identified as virtual objects that do not actually appear in video but which may be added for investigative purposes, training purposes, or other purposes.

In various example embodiments herein, the data analytics module 140 is configured to correlate video data and mobile communication device data captured by video cameras and antennae, respectively, to generate a profile of a person associated with the video data and the mobile communication device data. The profile may include profile data, such as the captured video data, the captured mobile communication data, and/or other types of data associated with the person (e.g., a name, a date of birth, a residential address, and/or the like).

The profile may include captured video data, captured mobile communication device data, temporal data associated with captured video or mobile communication device data, and/or location data associated with the captured video or mobile communication device data. The captured video data may include a captured still image and/or captured video footage. The mobile communication device data may include a WiFi identifier, a media access control (MAC) identifier, a Bluetooth identifier, a cellular identifier, a near field communication identifier, and a radio frequency identifier and/or any other identifier or data associated with a mobile communication device in communication with the antenna. The temporal data may include a time at which corresponding video data is captured and/or a time at which corresponding mobile communication device data is captured. The location data may include a location at which video data is captured and/or a location at which mobile communication device data is captured.

The data analytics module 140 may be configured to add to the profile, based on correlated video data and mobile communication device data, a number of visits of the person to a premises and/or a frequency of visits of the person to the premises. The data analytics module 140 may also configured to compare data obtained from a first source (e.g., a non-government database, a government database, and one or more previously generated profiles) to the captured video data, the captured mobile communication device data, the correlated video and mobile communication device data, and/or the profile, and identify the person based on the comparison.

The data analytics module 140 may also be configured to determine, based on the captured video and/or mobile communication device data, an arrival time and/or a departure time of the person at a particular premises or location. The data analytics module 140 may correlate the video data and the mobile communication device data based on the arrival time and/or the departure time. This time-based correlation, for instance, may enable the data analytics module 140 to associate a particular item of mobile communication device data (e.g., a Wi-Fi identifier) with a particular person captured on video.

In one example, the video camera 110 may be one of multiple video cameras 110 included in the system 100, and the video cameras 110 may be configured to capture multiple sets of video data, respectively. Likewise, the antenna 150 may be one of multiple antennae 150 included in the system, and the multiple antennae 150 may be configured to capture multiple sets of mobile communication device data, respectively. The data analytics module 140 may also be configured to correlate the multiple sets of video data and mobile communication device data to generate respective profiles for multiple people who are associated with the respective video data and mobile communication device data. The video cameras and antennae may be located at a plurality of different locations and/or premises.

In another example, the data analytics module 140 may be configured to assign a person to a positive list, an undetermined list, or a negative list based on the video data, the mobile communication device data, the profile data, and/or user-inputted criteria (e.g., inputted via the investigation module 800, described below). The data analytics module 140 may also be configured to determine that the video data, the mobile communication device data, and/or the profile corresponds to an employee or to a person on a predetermined list of people, and may assign the person to the positive list based on that determination.

In some example embodiments herein, the data analytics module 140 may be configured to detect a behavior of the person and store in the profile behavioral data corresponding to the behavior. The data analytics module 140 may, for instance, be configured to detect the behavior of the person by extracting behavioral information from the video data and/or the mobile communication device data. The behavior may include the person looking in a particular direction, reaching for an item of merchandise, purchasing the item of merchandise, traveling along a path at the premises, visiting an aisle or a location at the premises, spending an amount of time at the premises, spending an amount of time at the location at the premises, and/or visiting the premises on a number of separate instances. The data analytics module 140 may further be configured to classify the person as a new customer or a repeat customer at the premises based on premises visit data stored in the profile. The data analytics module 140 may add to the profile, or update in the profile, an indicator of whether the person is a new customer or a repeat customer at the premises. The data analytics module 140, in some cases, may be configured to detect the behavior of the person by correlating the video data, the mobile communication device data, and/or the profile data with a mapping of aisle locations at a premises, a mapping of merchandise locations at the premises, and/or a mapping of shelf locations at the premises.

In some example aspects herein, the data analytics module 140 may be configured to generate, based on captured video and/or mobile communication device data, location data corresponding to the particular behavior, and store the location data in the profile in association with the corresponding behavioral data.

Data analytics module 140 may be positioned in camera 110 to convert video-to-video data and non-video data and to provide the video data and the non-video data to the computer 120 over a network. As such, the system 100 distributes the video processing to the edge of the network thereby minimizing the amount of processing required to be performed by the computer 120.

Computer 120 includes computer-readable medium comprising software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network. The system user interface 122 may also be configured to receive one or more criteria from a user and may enable profiles to be mined based on the criteria. In some example embodiments herein, the user interface 122 may host an investigation module 800, as described in further detail below.

A user behavior is defined by an action, an inaction, a movement, a plurality of event occurrences, a temporal event, an externally generated event, or any combination thereof. A particular user behavior is defined and provided to the computer 120.

An action may include picking up an object wherein the object has been placed or left at a particular location. An action may include moving a particular object such as the opening of a door, drawer or compartment. An action may include positioning (or repositioning) a body part such as placing a hand in a pocket or patting oneself repeatedly at a particular location (an indication that a weapon may be concealed). The action may include moving to a particular position, a first individual engaging a second individual and/or moving a hand, arm, leg and/or foot in a particular motion. An action may also include positioning a head in a particular direction, such as, for example, looking directly at security personnel or a security camera 110. Various other examples have been discussed hereinabove.

Inaction may include failing to reach for an object wherein an object is dropped or positioned and the individual (e.g., object) does not retrieve the dropped object. Inaction may also include failing to walk to a particular location or failure to perform a particular task. For example, confirming that a security door is locked would require the action of approaching the door and the action of striking the door to ensure that it would not open. As such, the user behavior may be defined as the inaction of approaching the door and/or the inaction of striking the door to confirm that the door will not open. Various other examples of inaction have been discussed hereinabove.

A temporal event may include the identification of a customer that abruptly leaves a store, an individual dwelling at a store entrance or exit, an individual remaining in a particular location for a time period exceeding a threshold. Various other examples of a temporal event have been discussed hereinabove.

A user may identify a particular user behavior and provide and/or define characteristics of the particular user behavior in the computer 120. Computer 120 receives non-video data from the camera 110 wherein the non-video data includes behavioral information data. The particular user behavior may be defined by a model 143 of the behavior where the model 143 includes one or more attribute such a size, shape, length, width, aspect ratio or any other suitable identifying or identifiable attribute (e.g., tattoo or other various examples discussed herein). The computer 120 includes a matching algorithm or matching module 141, such as a comparator, that compares the defined characteristics and/or the model 143 of the particular user behavior with user behavior in the defined non-video data. Indication of a match by the matching algorithm or module 141 generates an investigation wherein the investigation includes the video data and/or non-video data identified by the matching algorithm 141. Investigations are a collection of data related to an identified event, and generally document behaviors of interest. As such, investigations require further review and investigation to understand the particular behavior.

The investigation may be sent to other cameras or systems on a given network or provided over a community of networks to scan for a match or identify and alert. Matching algorithm 141 may be configured as an independent module or incorporated into the data analytics module 140 in the computer 120 or in any cameras 110. The data analytics module 140 may also include a comparator module 142 configured to compare the model 143 of the particular user behavior and the non-video data.

A particular user behavior may be defined as positioning a head toward an observation camera 110 exceeds a preset period or positioning of a head directly toward a manager's office exceeds a preset period. This particular user behavior is indicative of a customer trying to identify the observation cameras 110 in a store in an effort to prevent being detected during a theft or an employee trying to determine if a manager is observing his/her behavior. The data analytics module 140 performs an algorithm to generate non-video data that identifies the head position of objects. The video analytic module 140 may also provide a vector indicating the facial and/or eye direction. The matching algorithm 141 searches the non-video data to determine if the head position and/or vector indicating facial direction exceeds the preset period. A match results in the generation of an investigation.

Figure 2:
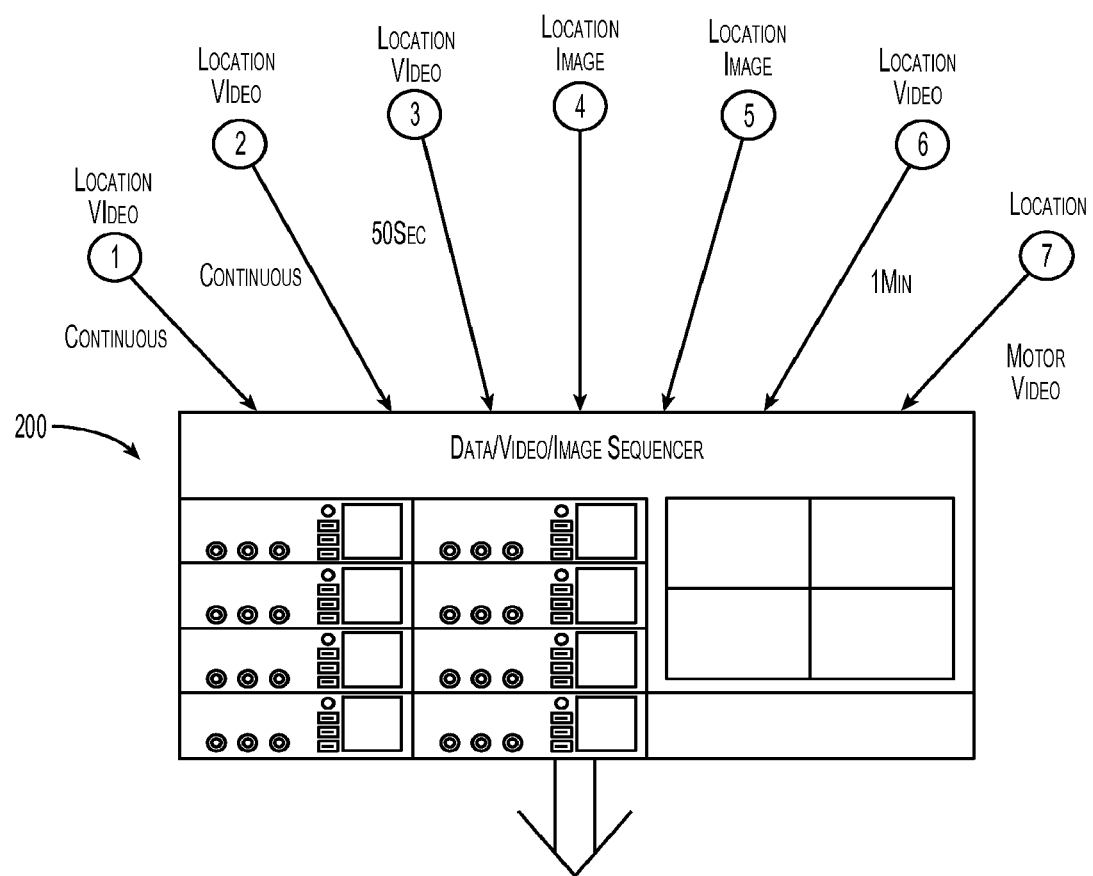
FIG. 2 is a data/video/image sequencer according to an embodiment of the present disclosure.

With reference to FIG. 2, a data/video/image sequencer according to an embodiment of this disclosure is shown as 200. Sequencer 200 is configured to receive video, video data, non-video data, video sequences, still images, and/or mobile communication device data from various sources of video (e.g., various of the one or more video cameras 110) and/or from various of the one or more antennae 150. For example, continuous video may be provided from locations 1 and 2, while motion only data may be provided from location 7. Video clips of short duration may be provided from locations 3 and 6 and still images may be provided from locations 4 and 5. Mobile communication device data may be provided from locations 1 through 7. This data may be communicated to the sequencer 200 by any suitable communications medium (e.g., LAN, WAN, Intranet, Internet, hardwire, modem connection, wireless, etc.). As shown in FIG. 2, data from each location may be communicated in any suitable manner, such as for instance, continuously, periodically at a predetermined rate, asynchronously, in response to receipt of a trigger, and the like.

Sequencer 200 generates a time-stamp from data provided with the video data, image data, and/or mobile communication device data. The time-stamp may be embedded into the video data, image data, and/or mobile communication device data, provided as part of the video data, image data, and/or mobile communication device data, or a time-stamp may be provided with the file containing the video data, image data, and/or mobile communication device data. Alternatively, sequencer 200 may be configured to receive user-entered data, included time-stamp information, associated with each input.

Sequencer 200 may additionally, or alternatively, generate a geo-location from the data provided with the video data, image data, and/or mobile communication device data. Geo-location information may be embedded into the video data, image data, and/or mobile communication device data, provided as part of the video data, image data, and/or mobile communication device data, or provided with the file containing the video data, image data, and/or mobile communication device data. For example, video, image, and/or mobile communication device data may contain a landmarking feature that may be used to identify the location where the picture was taken.

Sequencer 200 may additionally, or alternatively, generate field-of-view data (hereinafter "FOV data") for video data and/or image data. FOV data may be obtained from the camera location information, obtained from the information contained within the video (e.g., landmark identification) and/or entered by a user. Sequencer 200 may additionally, or alternatively, generate antenna range data for mobile communication device data. Antenna range data may be obtained from location information of the antenna 150, obtained from information contained within the mobile communication device data, and/or entered by a user.

Figure 3:
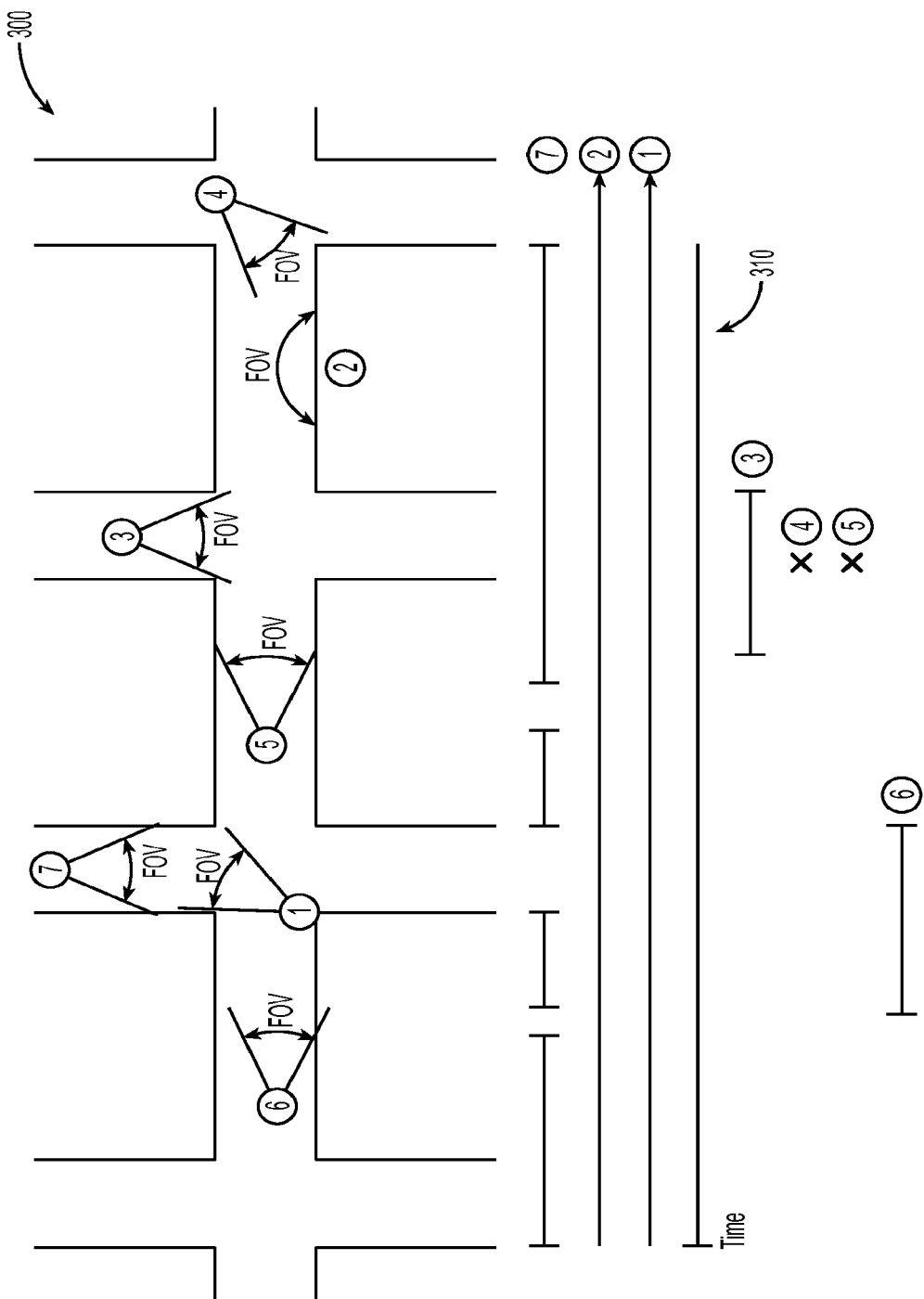
FIG. 3 is an illustration of an image map and an associated timeline generated by the sequencer of FIG. 2.

FIG. 3 is an illustration of an image map 300 and an associated timeline 310 generated by the sequencer 200. Sequencer 200 may be configured to utilize the time-stamp data, geo-location data, FOV data, and/or antenna range data to assemble an image map 300 and timeline 310 from all video data, image data, and/or mobile communication device data (or any portions thereof) provided to the sequencer 200.

A user may provide the sequencer 200 with a particular time and/or timeframe and the sequencer 200 provides all video, images, and/or mobile communication device data related to that particular time. Time and/or timeframe may be selected on the timeline 310 and the image map 300 may be updated to include all video data, image data, and/or mobile communication device data related to the selected time and/or timeframe.

A user may additionally, or alternatively, provide the sequencer 200 with a selected location and the sequencer provides all video data, image data, and/or mobile communication device data related to that particular location.

Selected locations may be selected on the image map 300 or provided as geo-location data to the sequencer 200.

A user may additionally, or alternatively, provide the sequencer 200 with a particular time and/or timeframe in addition to a geo-location to further narrow and isolate all video data, image data, and/or mobile communication device data related to that particular location.

After a particular time, timeframe and/or geo-location is used to identify video data, image data, and/or mobile communication device data, the user may utilize the searching algorithms, methods and system described herein to identify particular items of interest, patterns and/or individuals contained within the video data, image data, and/or mobile communication device data.

The present disclosure goes beyond facial recognition software (which may be utilized in conjunction herewith) and provides additional algorithms and analytics for tracking and/or investigative purposes as explained below. In addition, it is not necessary in certain instances that facial recognition be utilized to flag or track someone or something and the presently-described system may be employed without facial recognition software or algorithms which may prove insensitive to certain moral, federal or local laws.

The present disclosure also relates to an analytical recognition system for real time/post time object tracking based on pre-programmed parameters, e.g., real time and post time analysis, recognition, tracking of various pre-programmed (or post programmed) known objects or manually programmed objects based on shape, color, size, number of certain objects on a person(s), oddity for a particular circumstance (e.g., winter coat in 80° heat), similarity of particular object over the course of a particular time frame (similar items, e.g., backpacks, within particular area), separation of a sensitive object(s) from person for a preset period of time, odd object in particular area, objects placed near sensitive objects, similar objects being placed in similar areas and separated from person, particular color contrasts and combinations (e.g., red shirt exposed under black shirt, or white hat on black hair).

Figure 4:
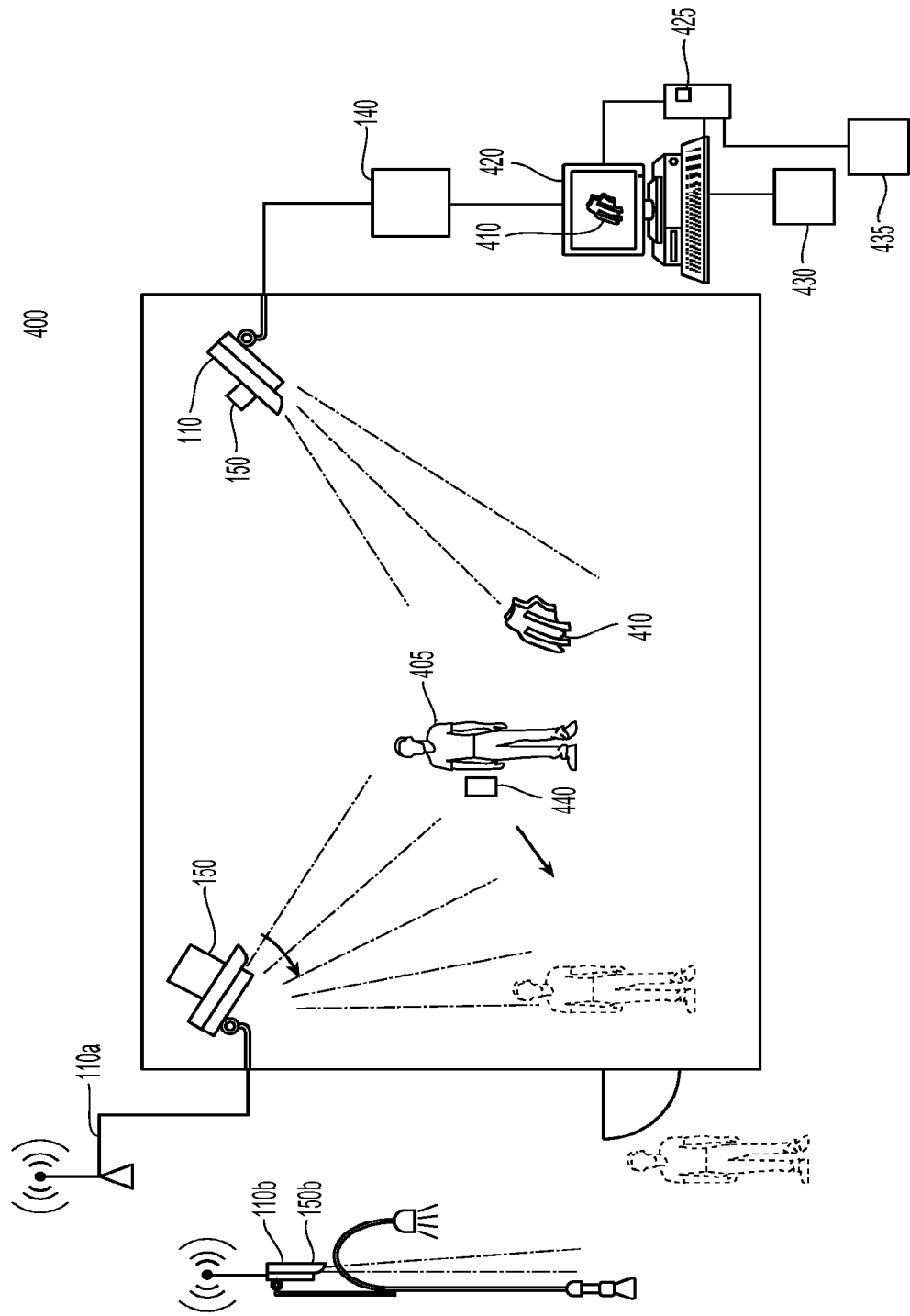
FIG. 4 is a schematic illustration of an analytical recognition system used for object identification and tracking according to another embodiment of the present disclosure.

Programmed objects may include objects with a particular known shape, size color or weight (as determined by number of people carrying, gait of person carrying, how the object is being carried, etc.) or based upon a look up library of objects and mapping algorithm. These objects may be pre-programmed into the analytical software and tracked in real time and/or post time for analysis. Manually programmed objects may be inputted into the software by color, size, shape, weight, etc. and analyzed and tracked in real time and/or post time to determine abnormal conditions or for other purposes. Manually programmed objects may be uploaded for analysis in real time, e.g., facial recognition images, tattoos, piercings, logos, or other indicia as explained in more detail below. Additionally, a user generated item and/or image may be generated from video data (e.g., frame data) and/or a still image and provided for analytics. For example and as shown in the an analytical recognition system 400 of FIG. 4, an object 410 (e.g., hat, backpack, outfit, or any identifiable feature) identified in a still image and/or a video frame (or identified as a result of one of the abnormal conditions described herein) may be isolated from an individual 405 for a preset amount of time (temporal event) and provided as a user generated item 410' for identification in live-video 420 or searched and identified in stored video 425, e.g., video frames and/or still images.

The person 405 may possess a mobile communication device 440 (e.g., a smartphone) equipped with one or more antennae (not shown in FIG. 4) by which one or more signals (e.g., mobile communication device data) are wirelessly transmitted. Examples of such mobile communication device data include signals (e.g., handshaking signals) that the mobile communication device 440 transmits in accordance with one or more wireless communication protocols, such as a WiFi communication protocol, a media access control (MAC)-based communication protocol, a Bluetooth protocol, a cellular protocol, a near field communication protocol, and a radio frequency identification protocol. As discussed above, the one or more antennae 150 are configured to capture the mobile communication device data transmitted by the mobile communication device when it is located within a range of the one or more antennae 150 and transmit the captured mobile communication device data to the data analytics module 140 for processing in accordance with various example embodiments herein.

System 400 may include data analytics module 140 that is configured to perform real time and/or post time analysis of video and non-video data (e.g., mobile communication device data) and tracking of every person with a backpack 410 within a particular area or within a particular camera view. Suspicious behavior and/or behavior of interest of one or more persons may be tracked and recorded and analyzed in either real time or post time. For example as identified in FIG. 4, if the backpack 410 is separated from a person 405 and left for a predetermined period of time, this video may be flagged for real time alerts and/or post time analysis. The object, e.g., backpack 410, might be flagged, time stamped and/or separated into an individual video stream for analysis later. A user in real time or post time analysis can zoom in for high-definition tracking or for incorporation into a data/video/image sequencer 200 as discussed herein. The person 405 dropping a preprogrammed suspicious object, e.g., backpack 410 (or any other object that is recognized by a library of images 430, user generated image/object 435 (via an input device) or a certain mapping algorithm or module 140) may be tracked and analyzed for real time alerts and/or post time analysis. The system 400 may both track the object 410 and flag and track the person 405 for real time or post time analysis through one or more cameras 110, a network of cameras 110, 110*a*, 110*b*, one or more antennae 150, and/or a network of antennae 150, etc.

In another example, the system 400 may flag and track in real time for alert purposes or post time analysis a person wearing a winter coat in the summer, a long raincoat when sunny, etc. This would also be classified as an alert or abnormal condition.

The system 400 may be capable of combining pre-programmed analytics to alert for one or more (or a combination of) abnormal scenarios. For example, a person carrying a case capable of carrying an semi-automatic or automatic rifle and that person loitering outside of a sensitive building for a pre-determined period of time may be automatically flagged, tracked and an alert sent to security.

The system 400 may be capable of tracking and analyzing particular objects and the software or data analytics module 140 may be pre-programmed to identify the same objects in later obtained video streams and/or still images. For example, a person of particular importance is scheduled to have a press briefing or scheduled to arrive at a particular location at a specific time. The scheduled event is postponed (intentionally or unintentionally). The software or data analytics module 140 may be preprogrammed to recognize certain objects (or persons with objects 410 or user generated objects 435) appearing in newly generated video for the re-scheduled event. In certain instances, the original video from the original time of the scheduled event may be reviewed and a user may pre-program the software or data analytics module 140 to look for certain "repeat" objects 410 (backpacks, coats, hats, clothing, briefcases, persons, etc.) in the real time video footage of the now re-scheduled event. A person may also be classified as a loiterer and flagged for review at the later scheduled event. A warning can be sent to the security team reviewing the tapes in real time if that was a person of interest.

Figure 5:
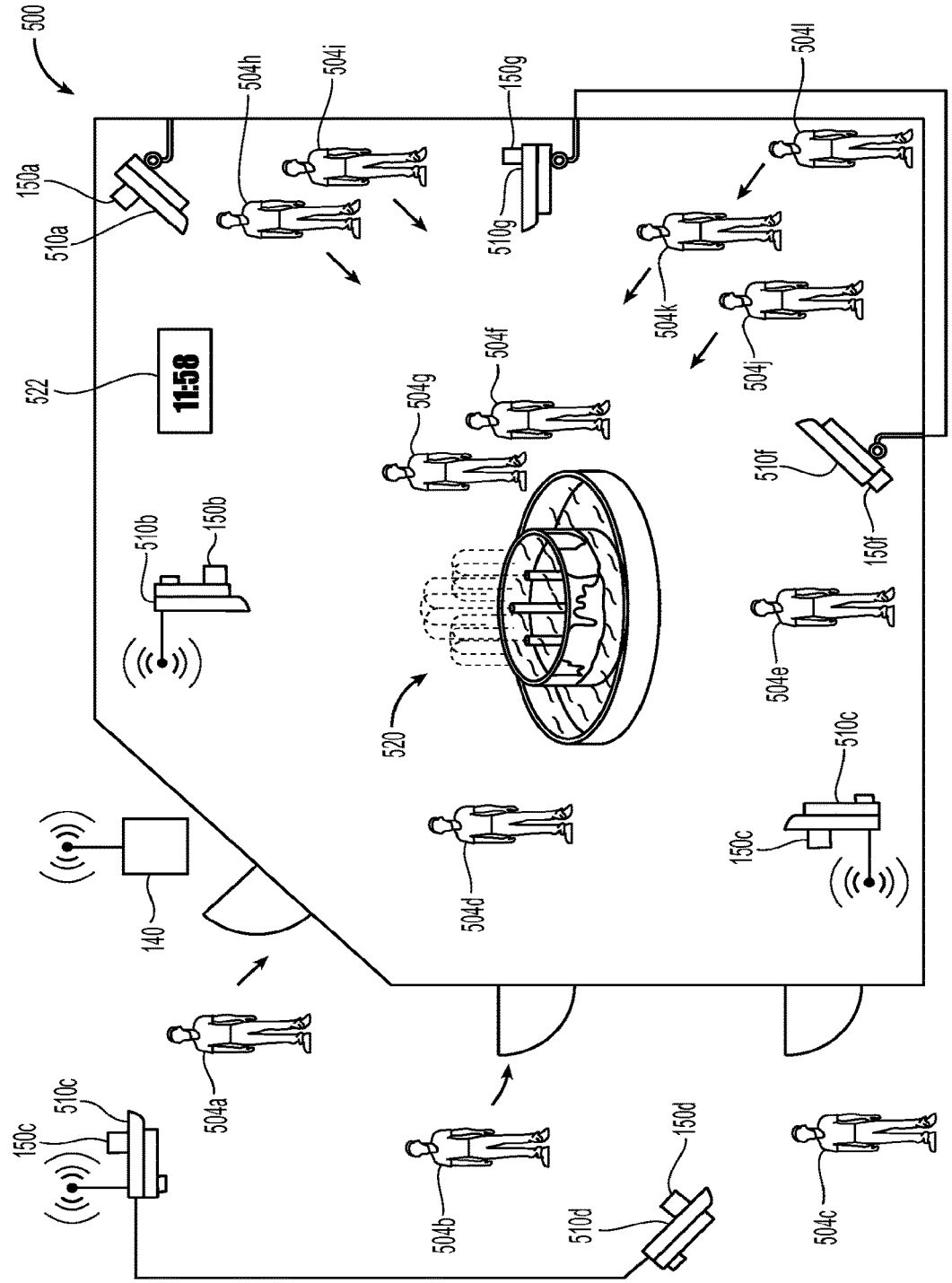
FIG. 5 is a schematic illustration of an analytical recognition system used for convergence tracking according to another embodiment of the present disclosure.

The data analytics module 140 may be configured to recognize abnormal patterns of behavior or unexpected patterns of behavior and alert security or investigators of potentially abnormal scenarios, events or conditions. The video and/or data may be configured for real-time analytics or post event analysis. For example, the data analytics module 140 can be programmed to recognize convergence patterns toward a particular geographical area and/or divergence patterns away from a particular geographical area. Global positioning software and vectoring may be utilized to accomplish this purpose. Recognition of convergent patterns and/or divergent patterns may be helpful in automatically recognizing potential flash mobs, mass robberies or other abnormal events. For example and as shown in FIG. 5, analytical recognition system 500 includes data analytics module 140 which may be configured to track an abnormal number of patrons 504a-504l arriving at a particular location 520 at or near a particular time 522. The data analytics module 140 may also be configured to track abnormal velocity of patrons 504a-504l and/or individuals arriving or departing from a particular location 520. A typical arrival and/or departure velocity may be preset or obtained from an algorithm of previous individuals that may have arrived or departed from a particular location over a preset or variable amount of time. Deviation from the arrival and/or departure velocity may trigger an abnormal condition.

Although not explicitly shown in FIG. 5, one or more of the people 504 may possess one or more corresponding mobile communication devices 440 (e.g., smartphones) equipped with one or more antennae by which one or more signals (e.g., mobile communication device data) are wirelessly transmitted. As discussed above, the one or more antennae 150 are configured to capture the mobile communication device data transmitted by the mobile communication devices 440 when they are located within the respective ranges of the one or more antennae 150 and transmit the captured mobile communication device data to the data analytics module 140 for processing in accordance with various example embodiments herein.

A security system 500 with the data analytics module 140 and one or more camera arrays or systems 510a-510g may be configured to recognize an abnormal number of people converging towards a particular geographical area 520 over a preset time. The data analytics module 140 may be configured to utilize vector analysis and/or image and data vector analysis algorithms and/or machine learning algorithms to assess one or more convergence patterns. Moreover, the system 500 may be configured to recognize similarities in clothing, age, articles being carried (e.g., briefcases, backpacks, other similar items) and alert security or investigators of a possible abnormal condition. This can be useful in recognizing so-called "flash mobs" or other highly sensitive situations during a parade, marathon, political speech, etc.

Divergence patterns and/or velocities may be used to identify unusual patterns of individuals departing from a particular area 520. For example, in the event of a panic-like situation the divergence velocity of individuals is expected to be greater than a preset or calculated average divergence velocity. As such, identification of one or more individuals leaving the particular area and/or situation at a velocity less than the average velocity or the panic-like velocity may indicate that the individual was not in a panic-like condition possibly due to the fact that he/she perpetrated or were aware of the particular panic-like situation. Moreover a person leaving an area with a higher than average velocity may be "running from an event", e.g., running from a robbery or away from an upcoming explosion.

The data analytics module 140 may also be configured to monitor web traffic and/or social media sites (Facebook®, MySpace®, LinkedIn®) relating to a particular location and/or event and provide alerts of that nature to security or combine web traffic relating to an event or geographic area with video analytics that recognize convergence patterns to alert of a potential flash mob or gang robbery. The data analytics module 140 may also work in reverse and access web traffic or various social media sites when a convergence pattern is recognized and ping one or more of these sites to gather additional information to possibly uncover more pattern activity or uncover a flash mob event at a particular location.

The data analytics module 140 may also be configured to monitor web traffic or social media sites for activities that precede a particular time stamp. For example, a social media posting conveys condolences for a particular event that coincides or precedes the particular event may indicate foreshadowing of the event and indicate prior knowledge of the upcoming event.

The system 500 and data analytics module 140 may be configured to analyze video and/or mobile communication device data from one or more street cameras, parking lot cameras, store/mall camera, or other camera systems 510a-510g to determine pre-programmed abnormal conditions or manually programmed conditions in real time. The system 500 may be configured to provide an alert if an abnormal number of cars are converging at a particular spot (e.g., shopping mall), and couple that information with footage from the parking lot surveillance cameras to ascertain how many people are converging on a particular store or place and couple that analytic with the in-store camera to determine loitering at a particular spot at a particular time or delta time. This is typical behavior of a flash mob or gang robbery. Again, the system 500 might tie into one or more social media sites for additional information and/or confirmation.

Similarly, the velocity patterns of the approaching cars, obtained from video and/or mobile communication device data, and/or the velocity at which individuals depart from their cars may also be indicative of abnormal condition.

Other examples of analytics that the data analytics module 140 may perform in real time and/or post time may relate to gang-type recognition. For example, the analytical recognition system 600 of FIG. 6 may be configured to recognize gang colors and/or color combinations and/or patterns and flag the video 618 and/or alert security if an abnormal number of individuals (or abnormal % of individuals) with particular colors or color combinations and/or patterns are converging on, or loitering in, a particular geographical area. The data analytics module 140 may be pre-programmed to recognize a particular characteristic or trait 615 of an individual or individuals 605a, e.g., clothing, head gear, pant style, shirt/coat colors, the manner it is worn, symbols, coat logos, tattoos, piercings, hair style, hand gestures, cars, motorbikes, etc. and alert security of an abnormal condition or a previous investigation stored as a previous image 625 in a computer 620. Alternatively, and/or additionally, the data analytics module 140 may be pre-programmed to recognize mobile communication device data (e.g., a cellular identifier) of a mobile communication device 440a of an individual 605a, and alert security of the presence of the individual 605a who may be a known person of interest. These individuals 605a may be flagged and tracked for a preset period of time or until he/she leaves the area. The overall image and characteristics 615 of a particular group of patrons in a crowd (similarities of colors, uniform, gear, clothing style, hair style, logos, piercings, tattoos, symbols, other gang-related indicia, cars, motorbikes or clothing, etc.) may be recognized and trigger an alert. The data analytics module 140 may provide an alert that x % of individuals in a particular crowd have a particular trait 615, e.g., same tattoo, red shirts on, have the same logo, hair style are carrying a specific object, etc. The data analytics module 140 may be configured to provide an alert based on an assessment that a predetermined number of individuals in a particular crowd have a particular trait 615.

The data analytics module 140 may be configured to provide graphical representations of numerous abnormal conditions to better facilitate recognition of patterns or very high levels (and/or predetermined levels) of one or more abnormal conditions. This may allow a higher number of patterns to be tracked and analyzed by one or more individuals. The data analytics module 140 may also recognize contact between individuals wherein the contact may be physical contact (e.g., handshake, an embrace or exchange of an object) or contact may be non-contact (e.g., engage in conversation, prolonged eye-contact or engaging in other non-physical contact that would indicate acknowledgement therebetween).

Figure 6:
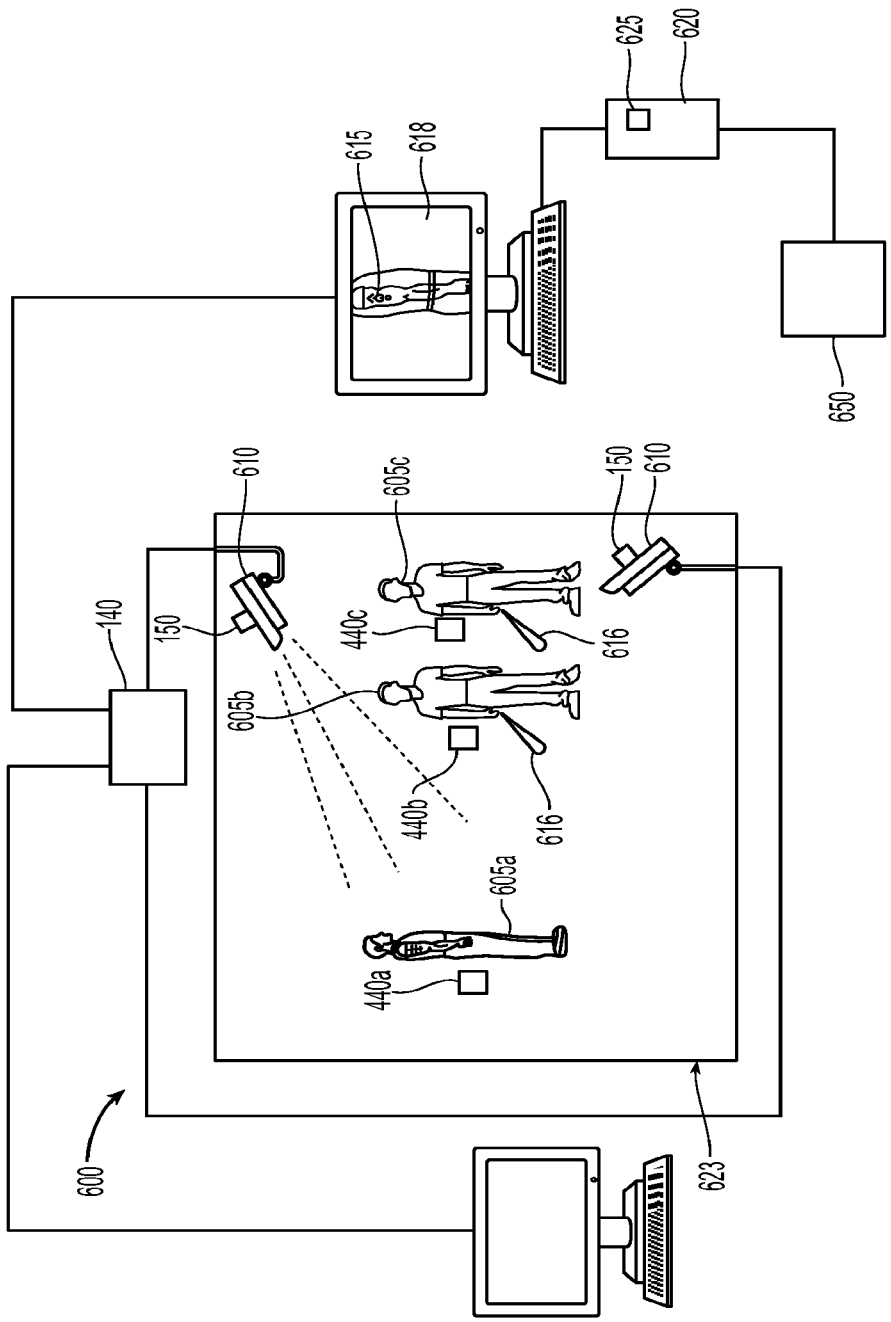
FIG. 6 is a schematic illustration of an analytical recognition system used for character trait recognition according to another embodiment of the present disclosure.

Other alert-type conditions may relate to abnormal scenarios wherein the data analytics module 140 recognizes an object being carried by an individual 605b that is unusual for a particular area. For example as shown in FIG. 6, a person carrying a pitchfork or shovel (not shown) in a mall 623, or a group (605b and 605c) carrying bats 616 in mall 623 and converging on a particular area. Again, real-time analysis of the video would be most useful and provide security with an abnormal condition alert. Post analysis may be helpful for determining offenders should an event take place when authorities are called to assist.

With any of the aforedescribed scenarios or alerts noted herein, the data analytics module 140 may work in conjunction with a video library of images or algorithms 650 and/or with one or more databases of aggregated mobile communication device data to trigger alerts or respond to queries. Additional images, such as a library images and/or user-generated images 650, may be provided as inputs to the data analytics module 140 and used to analyze video through the recognition aspects of the data analytics module 140. This may all happen in real time or during post time analysis. Again, queries may be entered depending upon a particular purpose and the system 100, 200, 300, 400, 500 and/or 600 can in real time or post time analyze video for the queried conditions.

The system 100, 200, 300, 400, 500 and/or 600 may be configured to perform three-dimensional face recognition. The system 100, 200, 300, 400, 500 and/or 600 may be manually programmed to recognize an individual or suspect 605a in an investigation (or prior felon) based on clothing type, piercings, tattoos, hair style, etc. (other than facial recognition which may also be utilized depending on authority of the organization (FBI versus local mall security)). An image of a suspect 705a may be scanned into the data analytics module 140 and items such as piercings, tattoos, hairstyle, logos, and headgear may be flagged and uploaded into the image database for analyzing later in real time or post time analysis. For example, if a thief 605a robs a convenient store and his/her facial image is captured onto one or more cameras 610, not only may his/her image be uploaded to all the store cameras 610, but other identifying information or characteristics or traits 615 as well, e.g., hair style, tattoos, piercings, jewelry, clothing logos, etc. If the thief 605a enters the store again, an alert will automatically be sent to security. Even if the system recognizes a similar tattoo or piercing pattern or logo 615 on a different person that person may be deemed a suspect for questioning by authorities. Again, this goes beyond mere facial recognition wherein that so-called different person would not necessarily be flagged and tracked.

The system 100, 200, 300, 400, 500 and/or 600 may also generate a library of individuals and/or patrons that regularly frequent or visit a particular location thereby eliminating the need to track these particular individuals and allowing the system 100, 200, 300, 400, 500 and/or 600 to focus on identification and tracking of individuals not previously identified and saved in the library. The library of patrons (not shown) may also link to a Point-of-Sale (POS) system thereby validating that the individuals identified and stored in the library are regular patrons.

Figure 7:
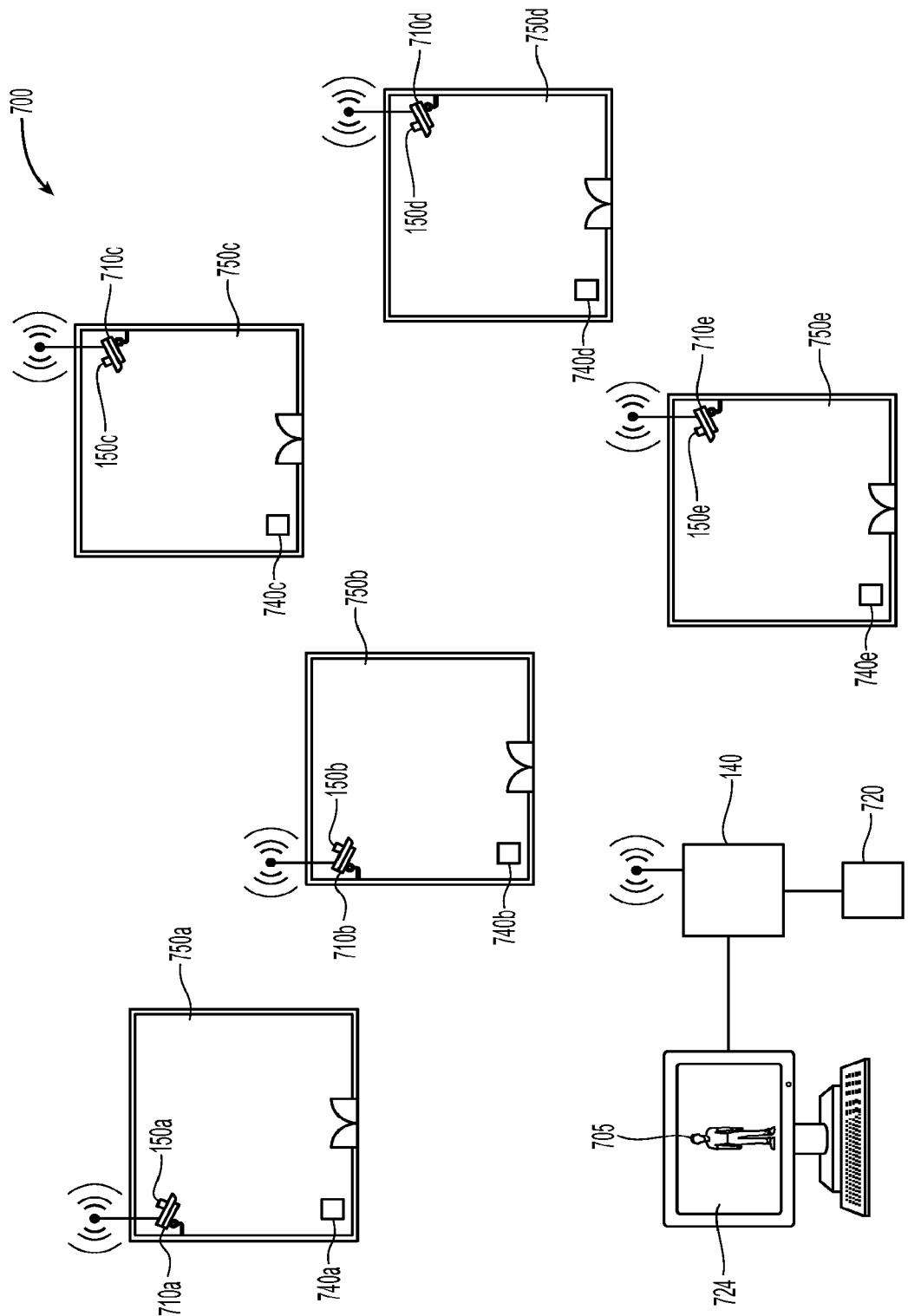
FIG. 7 is a schematic illustration of an analytical recognition system used for a community surveillance network according to another embodiment of the present disclosure.

As best shown in FIG. 7, another analytical recognition system 700 is shown with the data analytics module 140 being utilized with a chain of stores, a mall or a series of stores 750 in a town or community. The community of stores or a chain of stores 750a-750e is able to share video images 724, mobile communication device data, and/or other identifying information of characteristic or trait of known felons 705 across a network of cameras 710a-710e utilizing the same the data analytics module 140 (or uploading the image 724 and identifying information on an individual store analytical system 740a-740e). These local storeowners or store chains 750a-750e may be able to prevent additional losses by flagging and tracking known individuals 705 of particular interest (based on a prior characteristics or traits as described above and/or identifying information entered into an image and/or information database) once he/she 705 enters a store, e.g., store 750a. Alerts may be sent to local authorities of these individuals (or group of individuals) and they may be tracked throughout an entire network of cameras 710a-710e, including parking lot cameras, street cameras, etc. along a community network. Once an individual 705 is flagged and there is an alert, other information may be captured relating to car, car type, car route, accomplices, etc. Further, all cameras 710a-710e and/or antennae 150a-150e in the system 700 may be alerted to flag and track the individual 705 and accomplice in real time and/or for post time analysis.

The various described systems 100, 200, 300, 400, 500, 600, 700 and 800 may also be utilized to identify individuals with a "no contact" condition. For example, a building resident may have a restraining order issued by a court that prevents a particular individual from being within a certain proximity. The image, e.g., 724, may be entered into the system e.g., system 700 and the data analytics module 140 may identify the individual 705 and provide notice and/or documentation to the building resident and/or the authorities. Similarly, a government-generated database 720 may be provided to the system 700 wherein the database 720 includes a library of images 724 of individuals 705 identified in a particular legally mandated registration program.

A community may choose to set up a community network of cameras 710a-710e for this purpose. New owners of local businesses may opt to upload a particular felon's image 724 for analyzing (i.e., for local alerts) on a per occurrence subscription (e.g., dollar amount), e.g., a particularly violent felon's image 724 and additional identifying information may be of particular interest to an entire community for uploading on all networked cameras 710a-710e (or even standalone systems) while a small time shoplifter may not be of interest.

The data analytics module 140 may also utilize gait as an indicator of an individual or suspect, limp, shuffle, head angle, stride, hand sway, hand gestures, etc. A person's gait is as individual as a fingerprint and may be used to identify disguised felons. Many variables contribute to an individual gait and this information can be uploaded to the data analytics module 140 (e.g., walk velocity, step frequency, angle between feet, hand/arm position, hand/arm sway, limp, shuffle, etc.)

The data analytics module 140 may also be configured to alert security if a certain number of known images or events or habits occurs within a particular time period (e.g., self patting of particular area(s) X number of times within preset time period, patting or clenching of a known area for carrying or hiding weapons, nervous twitching or rapid head turning X number of times, leering around corners, looking at video cameras X number of times within a preset time period, etc. The data analytics module 140 may be configured to alert security or provide information to a user based on an abnormal or excessive habit or event occurring within a preset time limit or a combination of any of the events occurring within a preset time period. For example, a person walking through a store with hand clenched atop pants with rapid head turning may trigger an alert or abnormal situation. In another example, security is flagged or highlighted (or otherwise identified in a certain area(s) by the system 100, 200, 300, 400, 500, 600, 700 and/or 800) and a suspect leering in that direction repeatedly or repeatedly turning his/her head in that direction may trigger an alert or abnormal situation. In another example, an individual shopping and/or lingering in an area of a store that is typically an area with short dwell times (e.g., dwell time for a male in the make-up area is typically short while dwell-time for a female is typically, if not always, long).

As mentioned above, the analytical recognition system 100, 200, 300, 400, 500, 600, 700 and/or 800 of the present disclosure may be utilized to determine gun or weapon detection by virtue of pre-programming certain habitual behavior into the data analytics module 140 and analyzing the same (in real time and/or post time). For example, a person repeatedly grabbing a certain area known to house weapons and walking with a certain gait (e.g., walking with a limp might indicate carrying a shotgun) may be an indication of the person carrying a weapon. This information may be analyzed with other identifying information or indicia (e.g., tattoo, gang color, gang symbol, logo, etc.) to trigger an alert or abnormal situation. In another example, an individual is wearing a trench coat when it is not raining or on a sunny day in the Summer and leering or head turning. In this instance, the data analytics module 140 would need some sort of sensory input regarding rain or temperature or sunshine (light) and/or a connection to a system that provides such data. The time of day might also become a trigger or additional event that is preprogrammed into the data analytics module 140 analytics to heighten "awareness" of the data analytics module 140 when triggering alerts, e.g., very late at night or past midnight when more robberies tend to occur.

In other examples, the data analytics module 140 may allow the security personal to query the analytical recognition system 100, 200, 300, 400, 500, 600, 700 and/or 800 in real time or post time: "How many people with red baseball caps have entered the store or area within the delta of 5-10 minutes?"; "How many people are converging on the central fountain at this time or over this delta time?"; "How many people have lingered at the fountain for delta minutes?" Other queries may include instructions: "Scan and recognize/flag/follow/track people wearing long pants or winter coats (when 90° degree Summer day)"; "Scan and recognize/flag/follow/track people wearing red hats"; "Scan and recognize/flag/follow/track people carrying multiple backpacks"; "Scan and recognize/flag/follow/track people who have left objects (e.g., backpacks unattended)—track person over system, multiple systems, flag location of object, etc."; "Scan and recognize/flag/follow/track people loitering near sensitive areas, leaving objects near sensitive areas—track person over system, multiple systems, flag location; and/or "Alert if a delta number of unattended objects left at preset time or over preset time".

In another example, the data analytics module 140 may be configured to perform real-time video processing and analysis to determine a crowd parameter (e.g., a real-time crowd count or a real-time crowd density estimation) by automated processing of the video sequence of a physical space. The video analytic module 140 may include one or more algorithms configured to determine a rate of change in the crowd parameter. The rate of change in the crowd parameter may be indicative of crowd convergence or crowd divergence.

When the rate of change in the crowd parameter exceeds a predetermined threshold, the data analytics module 140 automatically issues an alert. For example, when the rate of change in the crowd parameter is indicative of crowd convergence, the data analytics module 140 may alert security of a potential flash mob or gang robbery. The data analytics module 140 may be configured to utilize vector analysis and/or image and data vector analysis algorithms and/or machine learning algorithms to assess one or more convergence patterns.

The data analytics module 140 may be connected to an array of cameras 510a-510g organized in a network, and upon issuance of an alert each camera in the network may be utilized to track one or more objects or individuals (e.g., patrons 504a-5041 shown in FIG. 5). When the rate of change in the crowd parameter is indicative of crowd divergence, the data analytics module 140 may alert security of a potentially hazardous situation or criminal activity.

Figure 8:
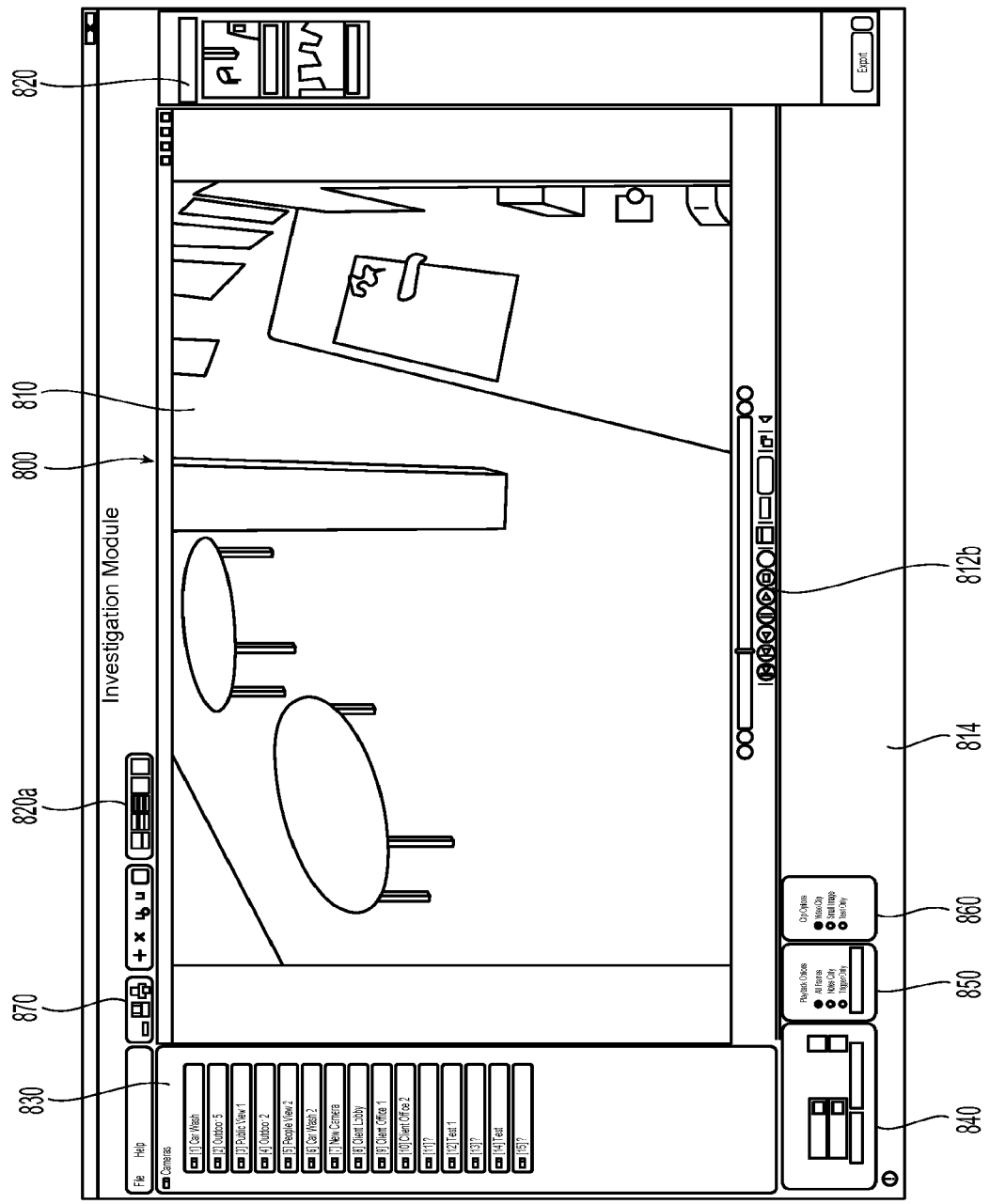
FIG. 8 is a screen-shot of an embodiment of an investigation module displaying an investigation in accordance with the present disclosure.

FIG. 8 is a screen-shot of the investigation module 800 displaying an investigation generated in accordance of an embodiment of this disclosure. Investigation module 800 is configured to generate and store information required to document a particular user behavior.

Additionally, the investigation module 800 may be configured to receive investigation criteria inputted by a user or a machine, and mine video data, mobile communication device data, and/or profile data based on the criteria. In one example, the investigation criteria may include a time frame, and the investigation module 800 may be configured to generate a list of people whose presence was detected on a premises during that time frame. The investigation module 800 may also be configured to determine a current location of a person by detecting a signal that matches a mobile communication device data previously obtained at another location.

In some example embodiments herein, the investigation module 800 is configured to receive report criteria inputted by a user requesting a particular type of report; mine video data, mobile communication device data, and/or profile data obtained from video cameras 110 and/or antennae 150, and/or sales data (e.g., obtained from a sales database); and generate a report based on the mining of the data. The report may include, for instance, a computed sales close rate corresponding to an item of merchandise, a merchandise category, an aisle at the premises, a shelf at the premises, and/or a predetermined location at the premises.

Investigation module 800 includes a viewing window 810 with upper and lower viewing control bars 812a, 812b, a text entry window 814, a timeline window 820, a camera window 830, a search window 840, a playback option window 850, a clip option window 860 and a file maintenance window 870.

Investigations automatically generated by the system 100 are populated with information related to the particular user behavior as discussed hereinabove. For example, the investigation illustrated in FIG. 8 includes a first video sequence 820a and a second video sequence 820b wherein the first video sequence 820a is from the downstairs camera and the second video sequence 820b is from a camera located at the elevator. In one embodiment, the first video sequence 820a was provided through an automatically generated investigation and the automatically generated investigation was provided to the loss prevention individual.

The first video sequence 820a is selected in the timeline window 820 and played in the viewing window 810. To further this explanation and for example, suppose the loss prevention individual, upon viewing the first video sequence 820a on a PDA, observes an individual removing a company laptop computer from the downstairs area. In generating the investigation, the system identified this user behavior as a particular user behavior and upon review, the loss prevention individual concurs that the automatically generated investigation has merit and escalated the automatically generated investigation to a theft investigation.

The automatically generated investigation was provided to the loss prevention individual in near real-time, therefore, the individual now in possession of the company laptop may have only taken a few steps from where the laptop was removed.

Using the PDA, the loss prevention individual furthers the automatically generated investigation (now a theft investigation) by observing temporally related video and video data available through the investigation module 800 on a PDA.

The search window 840 may automatically select a timeframe related to the investigation. The timeline may be manually controlled through the PDA.

Video and/or video data from one or more cameras listed in the camera window 830 may be selected for viewing in the viewing window 810. A plurality of video streams from individual cameras (see FIG. 1) may be viewed simultaneously by selecting an alternative viewing screen from the upper viewing control bar 812a.

The lower viewing control bar 812b allows viewing video in the viewing window 810 in real time or other selected speeds. The investigation module 800 provides an investigation playback speed wherein the playback speed is automatically calculated to replay video at a playback speed that requires the loss prevention individual to view every frame of the video sequence. Video is recorded and saved at speeds that exceed the ability of a human eye to detect slight movements. Additionally, the playback device may also have hardware and/or software limitations that prevent the playback device from displaying every frame of video. As such, playback of video at "real time" results in missing individual frames of video due to human viewing limitations and/or computer display limitations. The investigation playback speed is calculated based on the human viewing limitations and the display limitations of the particular device being used to view the investigation module 800.

Playback option window 850 allows the video sequence and/or the video from each camera to be played in various modes. The all frame display mode plays video at the calculated investigation playback speed wherein all frames are displayed and viewable during playback. The motion only display mode provides video sequences of the video that include motion. The trigger only display mode includes video sequences temporally related to a trigger.

Triggers include internal triggers and/or external triggers. Internal triggers include motion triggers defined by a user and determined by the data analytics module 140, POS triggers generated by the POS module 141 and analytics events defined by a tripline and/or a zone (e.g., entering and/or exiting a zone) and determined by the data analytics module 140. External triggers are generated by external hardware devices connected directly or indirectly to the computer 120.

At any point of the investigation the loss prevention individual may assign a video sequence to the timeline. For example, in FIG. 8 the loss prevention individual has added the second video sequence 820b to the investigation. The second video sequence 820b includes video provided from a camera positioned at the elevator and stairway. To further the scenario described hereinabove, suppose the loss prevention individual identified a suspect carrying the laptop and approaching an elevator displayed in the second video sequence 820b. In furtherance of the theft investigation, the loss prevention individual included the second video sequence 820b in the timeline of the investigation.

Loss prevention individual may select various options from the video clip window 860. The timeline window 820 may be populated with video clips including one or more video sequences, a still image generated from the video or text entered through the text entry window 814. A video clip may include a continuous video sequence. Alternatively, a video clip using the playback option of motion only (selected in the playback option window 850) includes a plurality of video sequences that include motion (e.g., non-motion portions of the video are excluded from the video clip). Finally, the loss prevention individual may capture a still image of a frame to capture an individual feature such as a facial image, a particular tool or object used during the theft, or any other significant image that may be required to further the investigation.

Finally, since the investigation is generated in near real-time, the loss prevention individual, upon confirmation of a theft currently in progress, is able to notify security and apprehend the thief before they are able to leave the premises.

Figure 9:
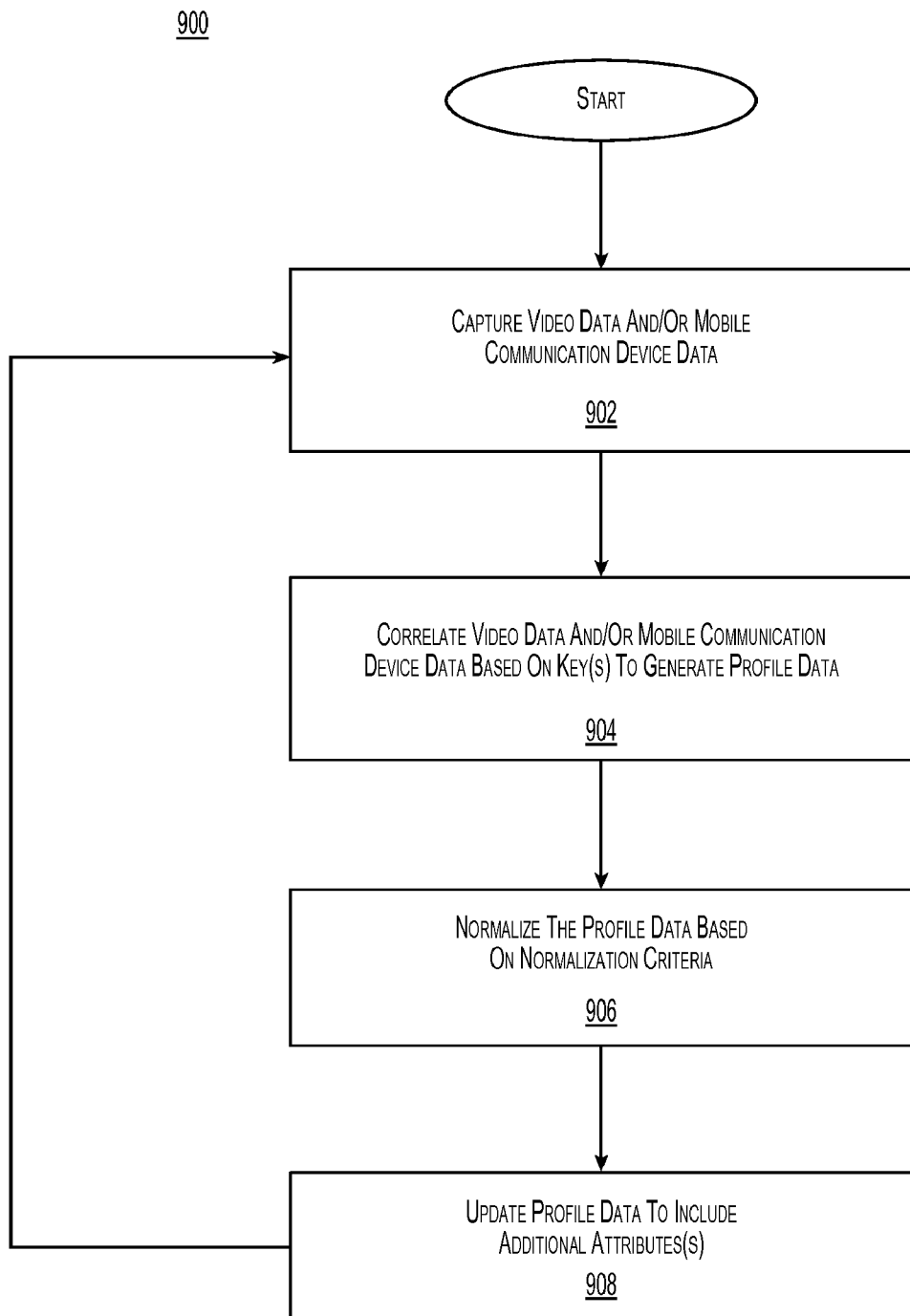
FIG. 9 is a flowchart of an analytical recognition method according to an example embodiment of the present disclosure.

Reference will now be made to FIG. 9, which shows a flowchart of an analytical recognition method 900 according to an example embodiment of the present disclosure. In accordance with an example embodiment herein, the method 900 may be employed to populate, based at least in part on video data and/or mobile communication device data captured by one or more video cameras 110 and/or one or more antennae 150, respectively, a database with data that may be useful for security purposes, investigative purposes, marketing purposes and/or the like.

At block 902, as described above in further detail with respect to FIG. 1, video data is captured by one or more video cameras 110 and mobile communication device data is captured by one or more one or more antennae 150. The video data, in one example, includes images of one or more people who were at one time located within view of the one or more cameras 110, and the mobile communication device data includes data captured from one or more mobile communication devices 440 that were at one time located within wireless communication range of the one or more antennae 150. Each item of the mobile communication device data may be associated with a respective mobile communication device that was carried by a respective one of the people of whom one or more of the images were captured.

At block 904, the items of video data captured at block 902 are correlated to respective items of mobile communication device data captured at block 902 based on one or more keys included within the captured video data and mobile communication device data. In one example, based on the correlating at block 904, respective profiles are generated of people associated with one or more respective items of the video data and/or mobile communication device data. Each profile may have profile data including any one or a combination of the captured video data, the captured mobile communication data, and/or additional data.

The one or more keys utilized at block 904 can include any one or a combination of attributes included within an item of video data or mobile communication device data, which can be used to identify the item of video data or mobile communication device data and/or to correlate multiple items of video data and/or mobile communication device data as being related to one another. For instance, a facial image of a person included in an item of video data captured at a first date and time may be used as a key by which that item of video data can be correlated with another item of video data captured at a second date and time. As another example, an IP address included in an item of mobile communication data captured at a first location (e.g., by a first video camera 110 or antenna 150) may be used as a key by which that item of mobile communication data can be correlated with another item of mobile communication data captured at a second location (e.g., by a second video camera 110 or antenna 150). Example types of keys include, without limitation, an identifier of a collector/beacon (e.g., a unique identifier of the particular video camera 110 or antenna 150 that captured the item of video data or mobile communication device data), a mobile communication device address (e.g., a Wi-Fi address, a Bluetooth address, a NFC address, an RFID address, a cellular address, a GPS device address, a MAC address, an international mobile subscriber identity (IMSI) identifier, and/or any other suitable address or identifier) included in the mobile communication device data captured from a mobile device 440, a signal strength of mobile communication device data captured from a mobile device 440, a date on which an item of video data or mobile communication device data is captured, a time at which an item of video data or mobile communication device data is captured, a location at which an item of video data or mobile communication device data is captured, a medium (e.g., a particular wireless communication protocol) by which an item of mobile communication device data is captured, and/or the like. The keys utilized at block 904, as well as any other data captured, generated, or otherwise resulting from the steps of method 900, can be encrypted using one or more suitable encryption algorithms in a known manner.

At block 906, the profile data generated at block 904 is normalized based on one or more normalization criteria. For example, the profile data can be normalized based on (1) the number of visits that people have made to a particular location (e.g., a store location having one or more cameras 110 and antennae 150 by which video data and/or mobile communication data was captured at block 902), (2) durations of time for which people have remained at a particular location, and/or (3) a frequency or repetition rate of visits that people have made to a particular location. This may be useful to identify repeat customers, a criminal casing a store before committing a robbery, and/or the like.

At block 908, the profile data generated at block 904 and/or normalized at block 906, is updated to include one or more attributes generated for respective profiles based on data aggregated for each profile/person over time. Examples of such attributes may include whether a person is a return shopper, a first time shopper, an employee, a passerby (e.g., as determined by a very brief duration of stay at a location, for example, where a person merely walks past a store but within range of a camera 110 and/or antenna 150 located at the store), whether the person shops at other locations of a particular retailer at which video data and/or mobile communication data of the person was captured, whether the person was engaged by an employee while located at a store, and/or the like. After block 908, the method 900 can return to block 902, so as to continually capture video data and/or mobile communication device data as described above.

As described above, the data captured, generated, or otherwise resulting from the various steps of the method 900 can be utilized for security and/or investigative purposes (e.g., after a robbery at a store), for marketing purposes, and/or the for many other purpose. For instance, the data can be utilized in one or more front-facing or covert applications (e.g., to generate a virtual lineup for criminal investigative purposes; to enable analysis of sales or marketing data in connection with a predetermined event, such as a holiday shopping season; to compute a true conversion rate of sales encounters; to analyze customer dwelling statistics; to generate a heat map based on actual historical sales at segments within a store; to generate paths taken by a user based on data captured from multiple cameras 110 and/or antennae 150; to identify people who remain within a store after the closing hours of that store; and/or the like).

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. A method for analytical recognition comprising:
 capturing by one or more video cameras video data including a video frame having a person;
 capturing mobile communication device data by one or more antennae, the mobile communication device data including an identifier of a mobile communication device associated with the person;
 correlating portions of the video data to respective portions of the captured mobile communication device data based on one or more keys included within the video data and the mobile communication device data; and
 generating a profile of the person associated with the correlated portions of video data and the mobile communication device data, wherein the profile includes profile data including at least one of the video data, the mobile communication device data, and additional data, the additional data including sales data or user-inputted data such as name, date of birth, other phone data, email address, or residential address,
 wherein the attributes include at least one of whether the person is a return shopper, a first-time shopper, an employee, a passerby, whether the person shops at other locations of a particular retailer, or whether the person was engaged by an employee while located at a store.

2. The method of claim 1, wherein the key included within the portion of video data is a facial image of the person.

3. The method of claim 1, wherein the key included within the mobile communication device data is at least one of an IP address of the mobile communication device, an identifier of the one or more antennae, signal strength of the mobile communication device data, or location of the one or more antennae.

4. The method of claim 1, further comprising normalizing the profile data based on one or more normalization criteria.

5. The method of claim 4, wherein the normalization criteria include at least one of number of visits the person has made to a particular location, duration of time the person has remained at a particular location, or a frequency or repetition rate of visits the person has made to a particular location.

6. The method of claim 1, further comprising updating the profile data to include one or more attributes generated based on data aggregated for each profile over time.

7. A system for analytical recognition comprising:
one or more video cameras configured to capture video data including a video frame having a person;
one or more antennae configured to capture mobile communication device data, which includes an identifier of a mobile communication device associated with the person; and
a processor configured to:
correlate portions of the captured video data to respective portions of the captured mobile communication device data based on one or more keys included within the captured video data and the mobile communication device data; and
generate a profile of the person associated with the correlated portions of video data and the mobile communication device data, wherein the profile includes profile data having at least one of the captured video data, the mobile communication device data, or additional data, the additional data including sales data or user-inputted data such as name, date of birth, other phone data, email address, or residential address,
wherein the attributes include at least one of whether the person is a return shopper, a first-time shopper, an employee, a passerby, whether the person shops at other locations of a particular retailer, or whether the person was engaged by an employee while located at a store.

8. The system of claim 7, wherein the key included within the portion of video data is a facial image of the person.

9. The system of claim 7, wherein the key included within the mobile communication device data is at least one of an IP address of the mobile communication device, an identifier of the one or more antennae, signal strength of the mobile communication device data, or location of the one or more antennae.

10. The system of claim 7, wherein the processor is further configured to normalize the profile data based on one or more normalization criteria.

11. The system of claim 10, wherein the normalization criteria include at least one of number of visits the person has made to a particular location, duration of time the person has remained at a particular location, or a frequency or repetition rate of visits the person has made to a particular location.

12. The system of claim 7, wherein the processor is further configured to update the profile data to include one or more attributes generated based on data aggregated for each profile over time.

* * * * *